(12) United States Patent
Wu

(10) Patent No.: US 9,344,924 B2
(45) Date of Patent: May 17, 2016

(54) METHOD OF HANDLING HANDOVER SECURITY CONFIGURATION AND RELATED COMMUNICATION DEVICE

(75) Inventor: Chih-Hsiang Wu, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 807 days.

(21) Appl. No.: 12/613,542

(22) Filed: Nov. 6, 2009

(65) Prior Publication Data

US 2010/0130207 A1  May 27, 2010

Related U.S. Application Data

(60) Provisional application No. 61/118,439, filed on Nov. 27, 2008.

(51) Int. Cl.
*H04M 1/66* (2006.01)
*H04W 36/00* (2009.01)
*H04W 12/06* (2009.01)

(52) U.S. Cl.
CPC ...... *H04W 36/0033* (2013.01); *H04W 36/0066* (2013.01); *H04W 12/06* (2013.01)

(58) Field of Classification Search
CPC ...................................................... H04W 36/30
USPC .................................................. 455/436, 410
See application file for complete search history.

(56) References Cited

U.S. PATENT DOCUMENTS

| | | | |
|---|---|---|---|
| 2005/0176431 A1* | 8/2005 | Herrero Veron | 455/436 |
| 2008/0267405 A1 | 10/2008 | Vialen | |
| 2008/0291874 A1* | 11/2008 | Bae et al. | 370/331 |
| 2010/0220862 A1* | 9/2010 | Geary et al. | 380/272 |
| 2010/0331011 A1* | 12/2010 | Vikberg et al. | 455/456.1 |
| 2011/0201337 A1* | 8/2011 | Forsberg et al. | 455/436 |
| 2011/0268083 A1* | 11/2011 | Ostrup et al. | 370/331 |

FOREIGN PATENT DOCUMENTS

| | | |
|---|---|---|
| EP | 1 448 009 B1 | 10/2008 |
| EP | 2 139 260 A1 | 12/2009 |
| WO | 2008138273 A1 | 11/2008 |

OTHER PUBLICATIONS

3GPP TS 33.401 v8.1.1 (Oct. 2008).*

(Continued)

*Primary Examiner* — Muthuswamy Manoharan
(74) *Attorney, Agent, or Firm* — Winston Hsu; Scott Margo

(57) ABSTRACT

A method of handling handover security configuration for a mobile device of a wireless communication system includes performing an inter-radio access technology, hereinafter called RAT, handover procedure from a serving network including a service domain to a target network including a plurality of service domains when receiving a handover command, wherein the mobile device includes security configuration corresponding to the service domain of the serving network and security configuration corresponding to the plurality of service domains of the target network, and updating the security configuration corresponding to at least one of the plurality of service domains according to the handover command no later than the time a connection with the target network is successfully established during the inter-RAT handover procedure.

25 Claims, 16 Drawing Sheets

(56) References Cited

OTHER PUBLICATIONS

Samsung, "CS security key derivation for HSPA", S2-087140, 3GPP TSG-SA2 Meeting #68, QingDao, China, Oct. 13-17, 2008, the whole document, XP050331661.
Nokia Siemens Networks et al., "HSPA SRVCC addition to TS 23.216", S2-085754, 3GPP TSG-SA WG2 Meeting #67, Sophia Antipolis, France, Aug. 25-29, 2008, XP050267768.
"Universal Mobile Telecommunications System (UMTS); General Packet Radio Service (GPRS) enhancements for Evolved Universal Terrestrial Radio Access Network (E-UTRAN) access (3GPP TS 23.401 version 8.3.0 Release 8)", ETSI TS 123 401 V8.3.0 (Oct. 2008), pp. 1-205, XP007912167.
"Universal Mobile Telecommunications System (UMTS); Evolved Universal Terrestrial Radio Access (E-UTRA) and Evolved Universal Terrestrial Radio Access (E-UTRAN); Overall description; Stage 2; (3GPP TS 36.300 version 8.5.0 Release 8)", ETSI TS 136 300 V8.5.0(Jul. 2008), pp. 1-137, XP014042193.
3GPP, 3GPP TS 23.272 V8.1.0 Circuit Switched Fallback in Evolved Packet System, Sep. 2008.
3GPP, 3GPP TSG-SA WG3 Meeting #52bis S3-081143, Sep. 2008.
3GPP, 3GPP TS 23.216 V8.1.0 Single Radio Voice Call Continuity (SRVCC), Sep. 2008.
3GPP, 3GPP TS 25.331 V8.4.0 Radio Resource Control (RRC) 8.3.6.3, Sep. 2008.
Samsung,"CS security key derivation for HSPA", 3GPP TSG-SA2 Meeting 68, S2-086904, Oct. 13, 2008.
Notice of Allowance mailed on Dec. 30, 2013 for the Taiwan application No. 098140552, filing date: Nov. 27, 2009, p. 1-4.

* cited by examiner

METHOD OF HANDLING HANDOVER SECURITY CONFIGURATION AND RELATED COMMUNICATION DEVICE

CROSS REFERENCE TO RELATED APPLICATIONS

This application claims the benefit of U.S. Provisional Application No. 61/118,439, filed on Nov. 27, 2008 and entitled "METHOD OF HANDLING SECURITY CONFIGURATION IN HANDOVER BETWEEN DIFFERENT RATS IN WIRELESS COMMUNICATIONS SYSTEM AND RELATED COMMUNICATION DEVICE" the contents of which are incorporated herein.

BACKGROUND OF THE INVENTION

1. Field of the Invention

The present invention relates to a method utilized in a wireless communication and communication device thereof, and more particularly, to a method for improving security configuring mechanisms associated with a handover in a wireless communication system and communication device thereof.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A "mobility from E-UTRA" procedure is an inter-RAT (Radio Access Technology) handover procedure for a user equipment (UE) to hand over from the LTE system to another RAT, such as the UMTS (Universal Mobile Telecommunications System), or GSM (Global System for Mobile communications), GERAN (GSM/EDEG radio access network) Iu mode. The E-UTRAN initiates the mobility from E-UTRA procedure by sending a MobilityFromEUTRACommand message including a handover message of the target RAT system. For example, the handover message is a "HANDOVER TO UTRAN COMMAND" message if the target RAT system is the UMTS system.

Information security shall be applied for transmissions during and after the handover to avoid malicious intruders. In the LTE, UMTS, and GERAN Iu mode systems, ciphering and integrity protection are employed, whereas the GERAN (non Iu mode) only applies ciphering. Furthermore, the LTE is a pure packet switched (PS) system, the UMTS, GERAN and GERAN Iu mode systems is a hybrid system of PS and CS (Circuit Switched) service domains. Thus, a UE compatible with all the abovementioned systems includes:

security configuration of the LTE system (for EUTRAN) including a START, a CK (Cipher Key), an IK (Integrity Key), a eKSI (evolved Key Set Identifier), a NAS DL COUNT (Non Access Stratum Downlink COUNT), and a $K_{ASME}$ (a key used between the UE and a mobile management entity);

security configuration of the UMTS (for UTRAN) and GERAN Iu mode systems including $START_{CS}/START_{PS}$, $CK_{CS}/CK_{PS}$, $IK_{CS}/IK_{PS}$, $KSI_{CS}/KSI_{PS}$, and $COUNT_{CS}/COUNT_{PS}$; and security configuration of the GERAN system including a GSM ciphering key (kc) and a GPRS (Global Packet Radio Service) ciphering key (kc).

Due to the pure PS feature of the LTE system, a CS (Circuit Switched) fallback handover and a Single Radio Voice Call Continuity (SRVCC) handover are introduced allowing the LTE UE to access the CS service domain. The CS fallback handover enables the provisioning of voice and other CS-domain services by reuse of CS infrastructure of the UMTS or GSM system when the UE is served by EUTRAN. The SRVCC provides the UE with the ability to transit a voice call from the VoIP (Voice over Internet Protocol)/IMS (IP Multimedia Subsystem) packet domain to the CS domain.

As can be seen from the above, the UE transits from a single service domain system to a multi-service domain system when performing an inter-RAT handover from the LTE system to any other abovementioned RAT systems.

In the abovementioned handovers, e.g. the CS fallback and SRVCC handovers, and procedure thereof, security configuring actions are not clearly specified for the UE. When the UE performs a handover from the E-UTRAN to the UTRAN, the UE needs to update security configuration by the followings: (1) setting START=0; (2) deriving (CK, IK) from the $K_{ASME}$; and the NAS DL COUNT; (3) setting the KSI to eKSI. After the update, the UE uses the updated security configuration for transmission security with the UTRAN. However, The prior art does not specify which service domain the UE has to select for the security configuration update so that the UE can randomly select the service domain. As can be seen from the above, the UTRAN supports two service domains for which the UE has the security configuration of ($START_{CS}$, $CK_{CS}$, $IK_{CS}$, $KSI_{CS}$) and ($START_{PS}$, $CK_{PS}$, $IK_{PS}$, $KSI_{PS}$). The UE possibly selects the service domain different from the service domain the UTRAN uses. For example, the UE selects the ($START_{CS}$, $CK_{CS}$, $IK_{CS}$, $KSI_{CS}$) for the update, whereas the UTRAN uses the security configuration of the PS service domain. This causes ciphering and integrity protection errors in transmissions during/after the handover, resulting in a connection break.

For simplicity, when the UE performs a handover from E-UTRAN (single service domain) to a multi-service domain system, the connection between the UE and the target network can be broken due to difference of service domain use of the security configuration.

SUMMARY OF THE INVENTION

Therefore, the present invention provides a method for improving security configuring mechanisms associated with an inter-RAT handover in a wireless communication system and related communication device to avoid security configuring incompliancy between the UE and the target network.

According to an embodiment of the present invention, a method of handling handover security configuration for a mobile device of a wireless communication system includes performing an inter-RAT handover procedure from a serving network including a service domain to a target network including a plurality of service domains when receiving a handover command, wherein the mobile device includes security configuration corresponding to the service domain of the serving network and security configuration corresponding to the plurality of service domains of the target network, and updating the security configuration corresponding to at least one of the plurality of service domains according to the handover command no later than the time a connection with the target network is successfully established during the inter-RAT handover procedure.

According to another embodiment of the present invention, a method of handling handover security configuration for a mobile device of a wireless communication system includes performing an inter-RAT handover procedure from a serving network including a service domain to a target network including a plurality of service domains when receiving a handover command, wherein the mobile device includes security configuration corresponding to the service domain of the serving network and security configuration corresponding to the plurality of service domains of the target network, and updating the security configuration corresponding to at least one of the plurality of service domains according to the handover command no later than the time a connection with the target network is successfully established during the inter-RAT handover procedure.

According to another embodiment of the present invention, a communication device of a wireless communication system for handling handover security configuration includes a computer readable recording medium, a processor, security configuration corresponding to a service domain of a serving network, and security configuration corresponding to a plurality of service domains of a target network. The computer readable recording medium is used for storing program code corresponding to a process. The processor is coupled to the computer readable recording medium, and used for processing the program code to execute the process. The process includes performing an inter-RAT handover procedure from the serving network to a target network when receiving a handover command, and updating the security configuration corresponding to at least one of the plurality of service domains according to the handover command no later than the time a connection with the target network is successfully established during the inter-RAT handover procedure.

According to another embodiment of the present invention, a communication device of a wireless communication system for handling handover security configuration includes a computer readable recording medium, a processor, security configuration corresponding to a service domain of a serving network, and security configuration corresponding to a plurality of service domains of a target network. The computer readable recording medium is used for storing program code corresponding to a process. The processor is coupled to the computer readable recording medium, and used for processing the program code to execute the process. The process includes performing an inter-radio access technology, hereinafter called RAT, handover procedure from the serving network to a target network when receiving a handover command, and updating the security configuration corresponding to at least one of the plurality of service domains according to the handover command no later than the time a connection with the target network is successfully established during the inter-RAT handover procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
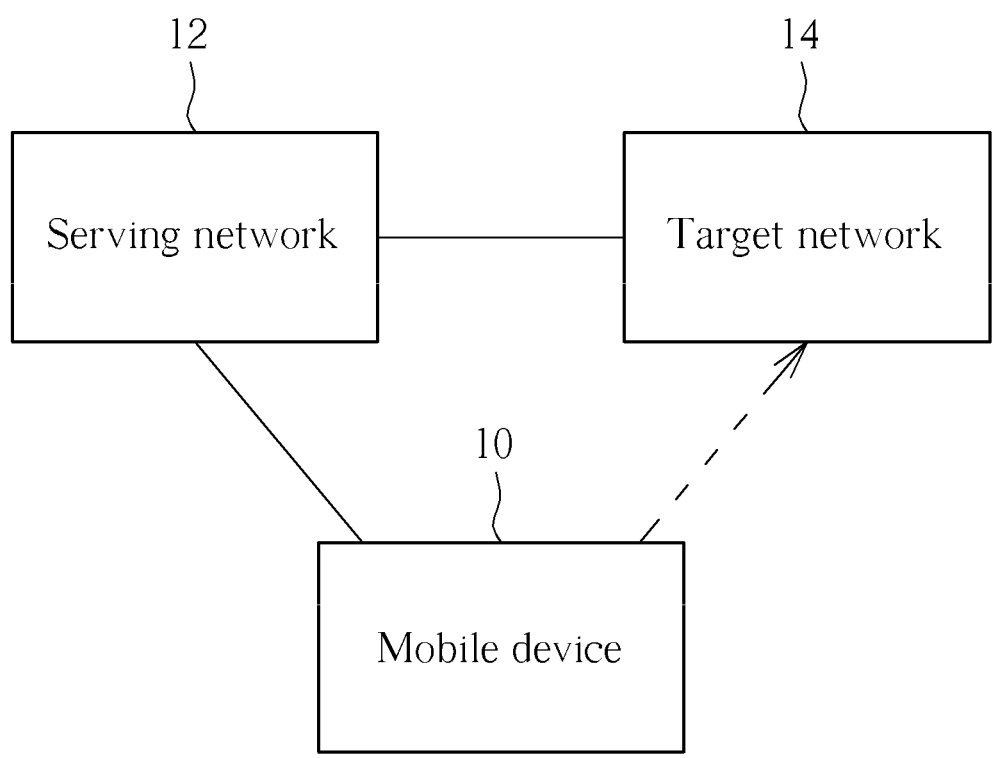
FIG. 1 is a schematic diagram of a wireless communication system.

Please refer to FIG. 1, which illustrates a schematic diagram of system architecture corresponding to a handover. In FIG. 1, a serving network 12 serving a mobile device 10 and a target network 14 employ different radio access technologies (RATs), and the mobile device 10 supports both of the RATs. The serving network 12 supports a single service domain and may be a LTE (long-term evolution) or a HSPA+ (High Speed Packet Access Plus) system network only supporting a PS (Packet Switched) service domain. The target network 14 supports multiple service domains and may be a network of a UMTS (Universal Mobile Telecommunications System) system, a GSM system or a GERAN Iu mode system supporting both PS (Packet Switched) and CS (Circuit Switched) service domains. In the LTE system, the network is referred as a EUTRAN (evolved-UTRAN) comprising a plurality of eNBs (evolved-Node Bs); In the UMTS system, the network is referred as a UTRAN (UTRAN) comprising a radio network controller (RNC) and a plurality of NBs (Node Bs); In the GSM/GERAN Iu mode system, the network is referred as a GERAN comprising a base station controller (BSC) and a plurality of base stations. The mobile device 10 are referred as a user equipment (UEs) or a mobile station (MS) supporting the abovementioned RATs and may be a device such as a mobile phone, a computer system, etc. Besides, the network and the mobile device 10 can be seen as a transmitter or receiver according to transmission direction, e.g., for uplink (UL), the mobile device 10 is the transmitter and the network is the receiver, and for downlink (DL), the network is the transmitter and the mobile device 10 is the receiver. When the mobile device 10 performs an inter-RAT handover from the serving network 12 to the target network 14, the serving network 12 transfers necessary configuration (capability, mobility, security configuration, etc.) of the target network 14 to the mobile device 10 so that the mobile device 10 changes its configuration based on the transferred configuration and establishes a connection to the target network 14. When the connection establishment is successful, the mobile device 10 disconnects with the serving network 12.

Figure 2:
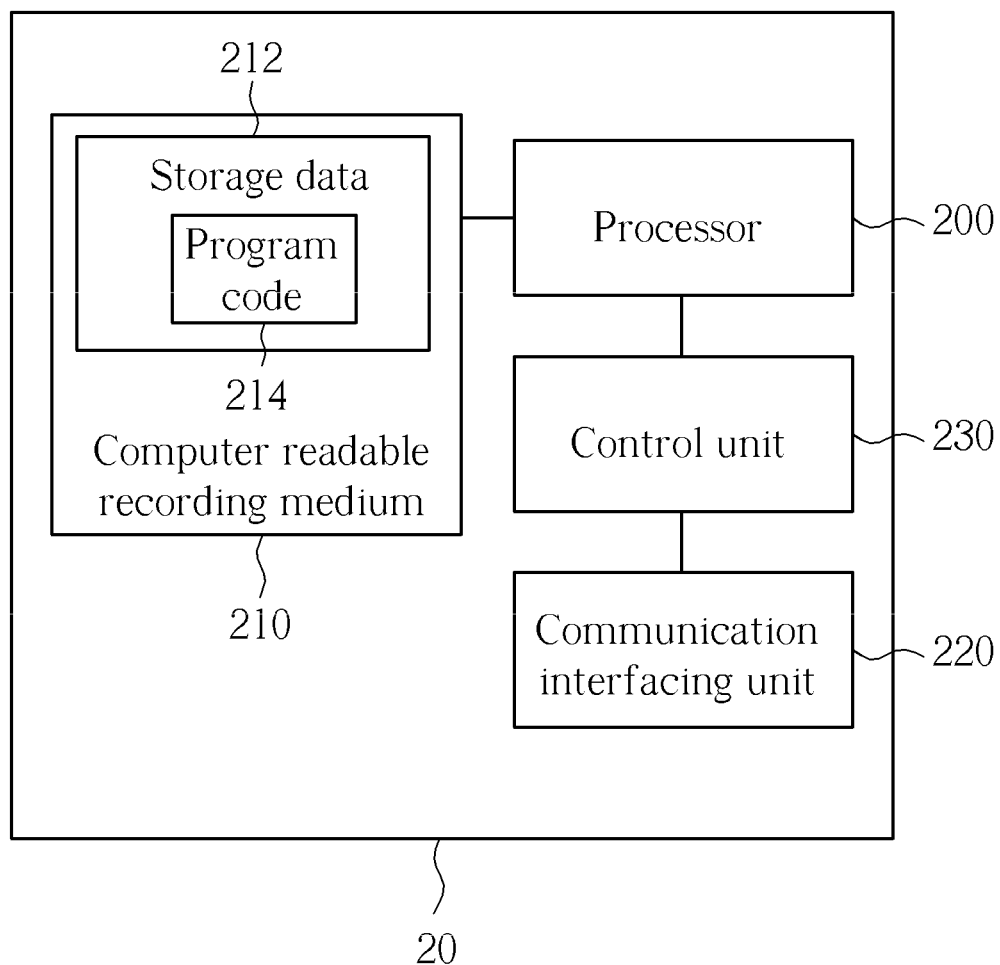
FIG. 2 is a schematic diagram of a communication device according to an embodiment of the present invention.

Please refer to FIG. 2, which illustrates a schematic diagram of a communication device 20 according to an embodiment of the present invention. The communication device 20 can be the mobile device 10 shown in FIG. 1 and includes a processor 200, a computer readable recording medium 210, a communication interfacing unit 220 and a control unit 230. The computer readable recording medium 210 is any data storage device that includes program code 214, thereafter read and processed by the processor 200. Examples of the computer readable recording medium 210 include a subscriber identity module (SIM), a universal subscriber identity module (USIM), read-only memory (ROM), random-access memory (RAM), CD-ROMs, magnetic tapes, hard disks, optical data storage devices, and carrier waves (such as data transmission through the Internet). The control unit 230 controls the communication interfacing unit 220 and related operations and states of the communication device 20 according to processing results of the processor 200. The communication interfacing unit 220 is preferably a radio transceiver and accordingly exchanges wireless signals with the network.

Preferably, the communication device 20 supports the LTE, UMTS, GSM, and GERAN Iu mode systems. For security operation, the communication device 20 stores:

security configuration of the LTE system (for EUTRAN) including a START, a CK (Cipher Key), an IK (Integrity Key), a eKSI (evolved Key Set Identifier), a NAS DL COUNT (Non Access Stratum Downlink COUNT), and a $K_{ASME}$ (a mobile-management-level key used between the UE and a mobile management entity);

security configuration of the UMTS (for UTRAN) and GERAN Iu mode systems including $START_{CS}/START_{PS}$, $CK_{CS}/CK_{PS}$, $IK_{CS}/IK_{PS}$, $KSI_{CS}/KSI_{PS}$, and $COUNT_{CS}/COUNT_{PS}$; and security configuration of the GERAN system including a GSM ciphering key (kc) for the CS domain and a GPRS (Global Packet Radio Service) ciphering key (kc) for the PS domain.

Figure 3:
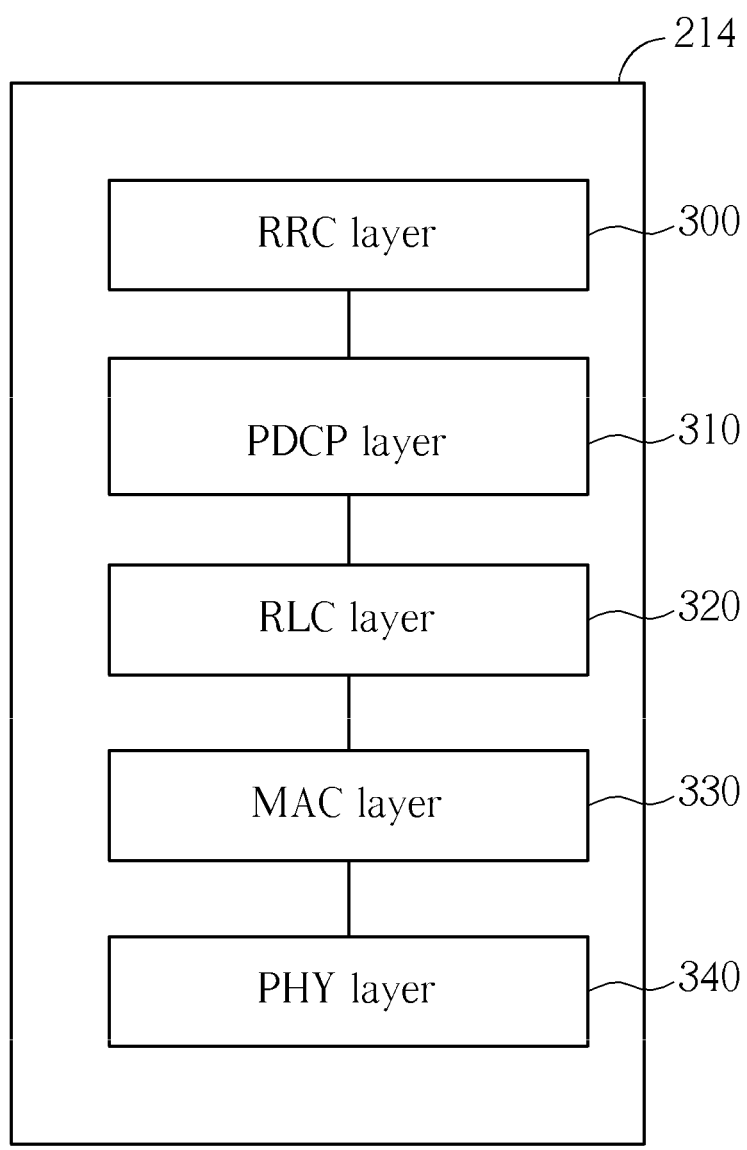
FIG. 3 is a schematic diagram of the program code for the LTE system according to an embodiment of the present invention.

Please refer to FIG. 3, which illustrates a schematic diagram of the program code 214 for the LTE system according to an embodiment of the present invention. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340.

The RRC layer 300 is responsible for configuring the security parameters according to information elements (IEs) and RRC messages received from the network. When the RRC layer 300 receives a MobilityFromEUTRACommand message regarded as a handover command, the communication device 20 performs a "mobility from E-UTRA" procedure that is an inter-RAT handover from the LTE system. The MobilityFromEUTRACommand message includes a handover command of the target network, e.g. a "Handover to UTRAN command" message for a handover to the UMTS system. The RRC layer 300 modifies related connection, security, and mobility configuration according to the handover command of the target network and generates corresponding handover complete message. When the handover complete message is successfully transmitted from the communication device 20 to the target network, this means that the inter-RAT handover is complete and an RRC connection is established.

During the mobility from E-UTRA procedure from the LTE (single service domain) to any of the UMTS, GSM, and GERAN Iu mode systems (multiple service domains), the communication device 20 updates the security configuration corresponding to at least one of the PS and CS service domains according to the handover command with the security parameters of the LTE system no later than the time a connection with the target network is successfully established. For clearly understanding about the concept of the present invention, processes for handling the security configuration are provided in the following.

Figure 4:
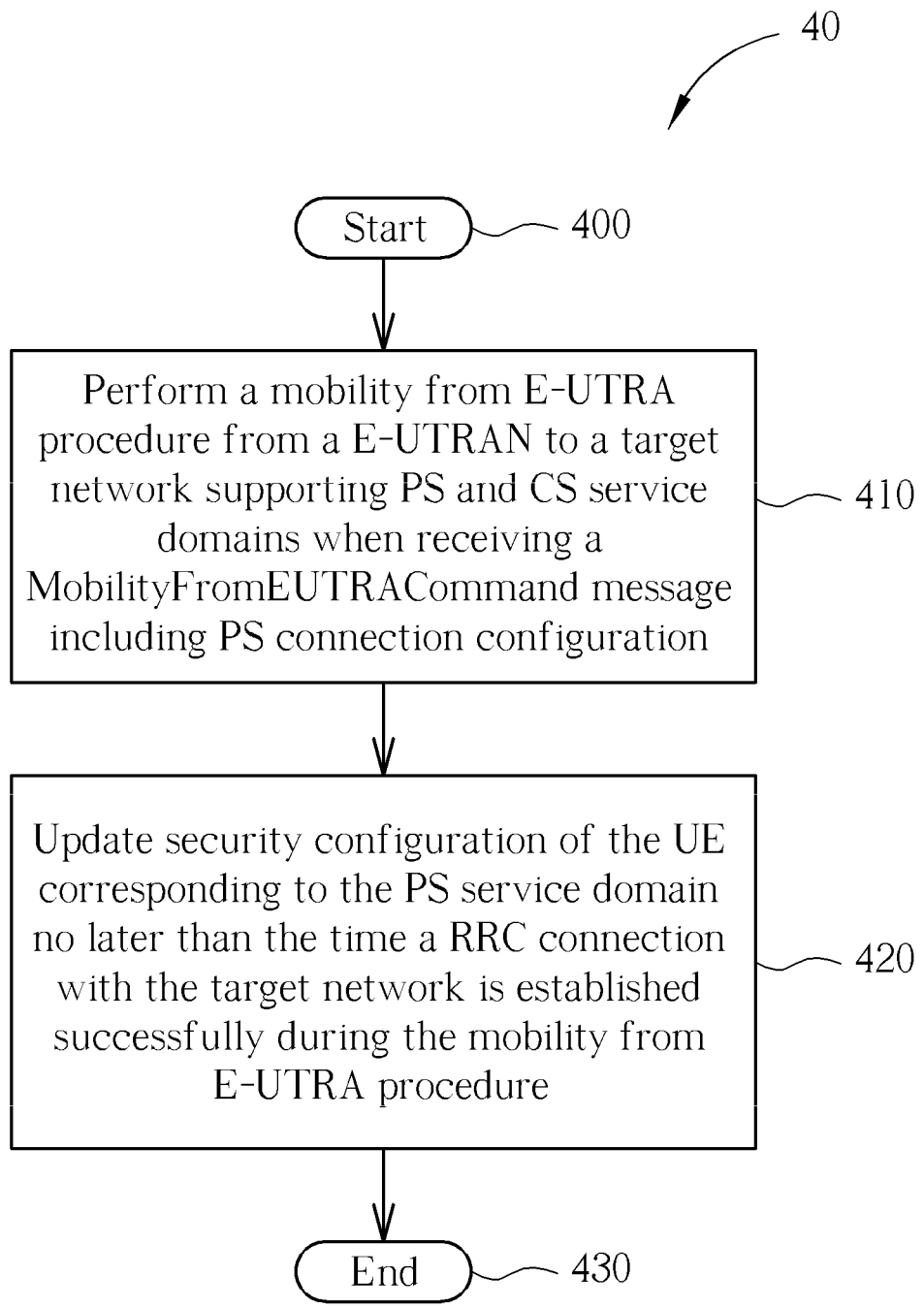
FIG. 4 is a flowchart of a process according to a first embodiment of the present invention.

Please refer to FIG. 4, which illustrates a flowchart of a process 40 according to a first embodiment of the present invention. The process 40 is utilized in a UE of the LTE system for handling handover security configuration. The process 40 can be compiled into the program code 214 and includes the following steps:

Step 400: Start.

Step 410: Perform a mobility from E-UTRA procedure from a E-UTRAN to a target network supporting PS and CS service domains when receiving a MobilityFromEUTRACommand message including PS connection configuration.

Step 420: Update security configuration of the UE corresponding to the PS service domain no later than the time a RRC connection with the target network is established successfully during the mobility from E-UTRA procedure.

Step 430: End.

According to the process 40, the UE updates its own security configuration whose service domain is the same as the service domain indicated by the MobilityFromEUTRACommand message before or upon the time the RRC connection with the target network is established successfully. In other words, the security configuration corresponding to the PS service domain has been completely updated after the RRC connection with the target network is established successfully. Furthermore, the UE can use the updated security configuration for security activation when the RRC connection is successfully established. The MobilityFromEUTRACommand message including the PS connection configuration indicates that the security configuration of the target network corresponding to the PS domain is also updated and used no later than the time of the successful RRC connection for following transmissions with the mobile device. The UE further retains the CS security configuration if the handover command does not include any CS connection configuration.

Preferably, the UE updates the security configuration corresponding to the PS service domain with the security configuration of the LTE system. The security configuration for the update is different depended on the target network. When the target network is the UTRAN or the GERAN with the Iu mode, the UE sets the $START_{PS}$ to 0, sets the $KSI_{PS}$ to the eKSI, and derives ($CK_{PS}$, $IK_{PS}$) from the $K_{ASME}$ and the NAS DL COUNT with a one-way key derivation function KDF. Furthermore, the UE retains ($START_{CS}$, $CK_{CS}$, $IK_{CS}$, $KSI_{CS}$, $COUNT_{CS}$).

When the target network is the GERAN (non-Iu mode), the UE derives ($CK_{PS}$, $IK_{PS}$) from the $K_{ASME}$ and the NAS DL COUNT with a one-way key derivation function KDF, and then derives the GPRS ciphering key Kc from the derived ($CK_{PS}$, $IK_{PS}$) with a conversion function c3. In addition, ($CK_{CS}$, $IK_{CS}$) are retained.

Figure 13:
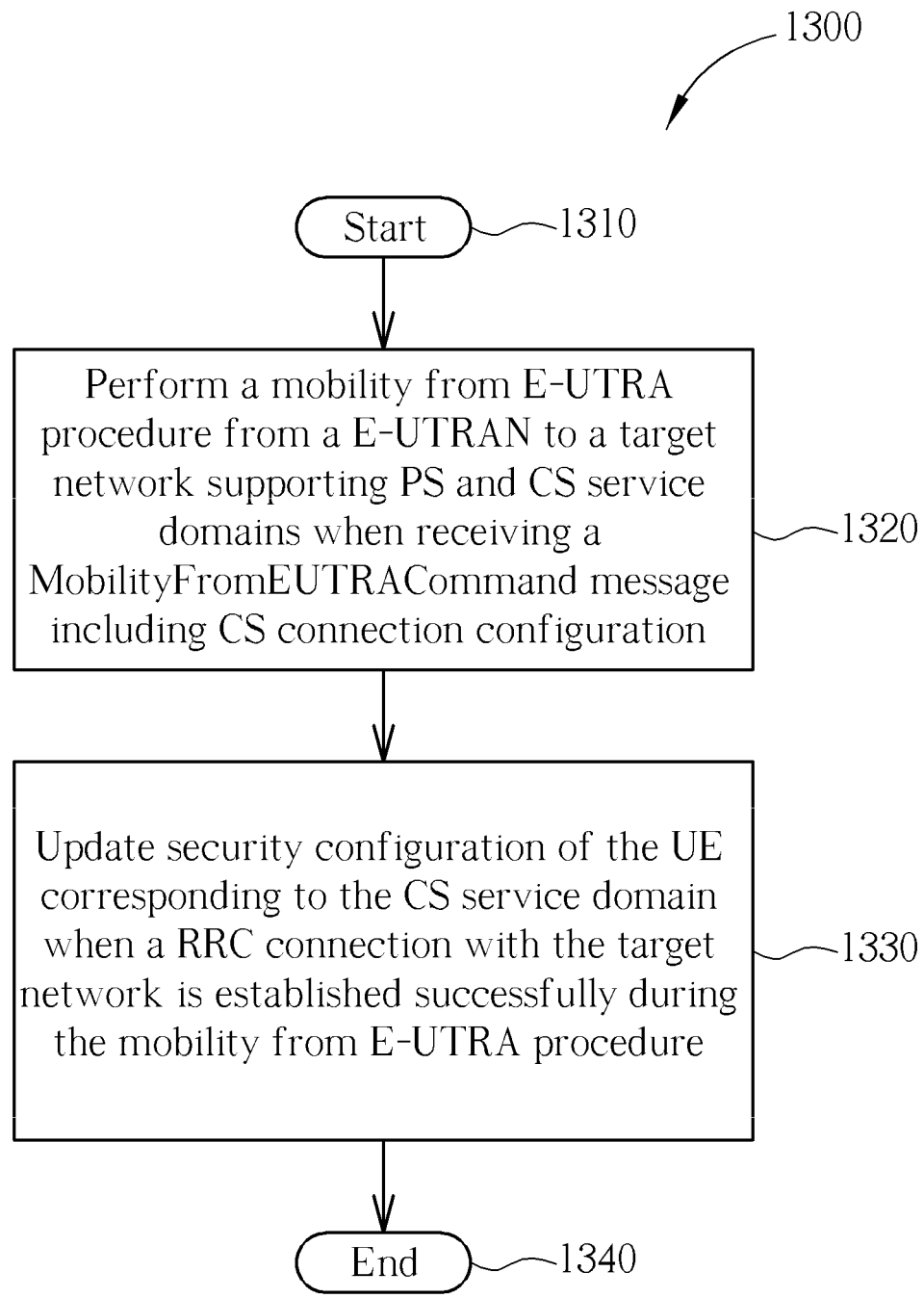
FIG. 13 is a flowchart of a process according to FIG. 4.

On the other hand, the MobilityFromEUTRACommand message can include CS connection configuration instead of the PS connection configuration. In this situation, the UE behavior can be modified to update security configuration of the UE corresponding to the CS service domain when a MobilityFromEUTRACommand message includes CS connection configuration and a RRC connection with the target network is established successfully during the mobility from E-UTRA procedure, as shown in FIG. 13. Preferably, the mobility from E-UTRA procedure is used for a Single Radio Voice Call Continuity (SRVCC) handover.

Similarly, the UE further retains the PS security configuration if the handover command does not include any PS connection configuration. The UE updates the security configuration corresponding to the CS service domain with the security configuration of the LTE system depended on the target network. The abovementioned PS/CS connection configuration can be a "RAB info" IE including a PS/CS RAB (Radio Bearer).

When the target network is the UTRAN or the GERAN with the Iu mode, the UE sets the $START_{CS}$ to 0, sets the $KSI_{CS}$ to the eKSI, and derives ($CK_{CS}$, $IK_{CS}$) from the $K_{ASME}$ and the NAS DL COUNT with a one-way key derivation function KDF. Furthermore, the UE retains ($START_{PS}$, $CK_{PS}$, $IK_{PS}$, $KSI_{PS}$, $COUNT_{PS}$). When the target network is the GERAN (non-Iu mode), the UE derives ($CK_{CS}$, $IK_{CS}$) from the $K_{ASME}$ and the NAS DL COUNT with a one-way key derivation function KDF, and then derives the GSM ciphering key Kc from the derived ($CK_{CS}$, $IK_{CS}$) with a conversion function c3. In addition, ($CK_{PS}$, $IK_{PS}$) are retained.

Figure 5:
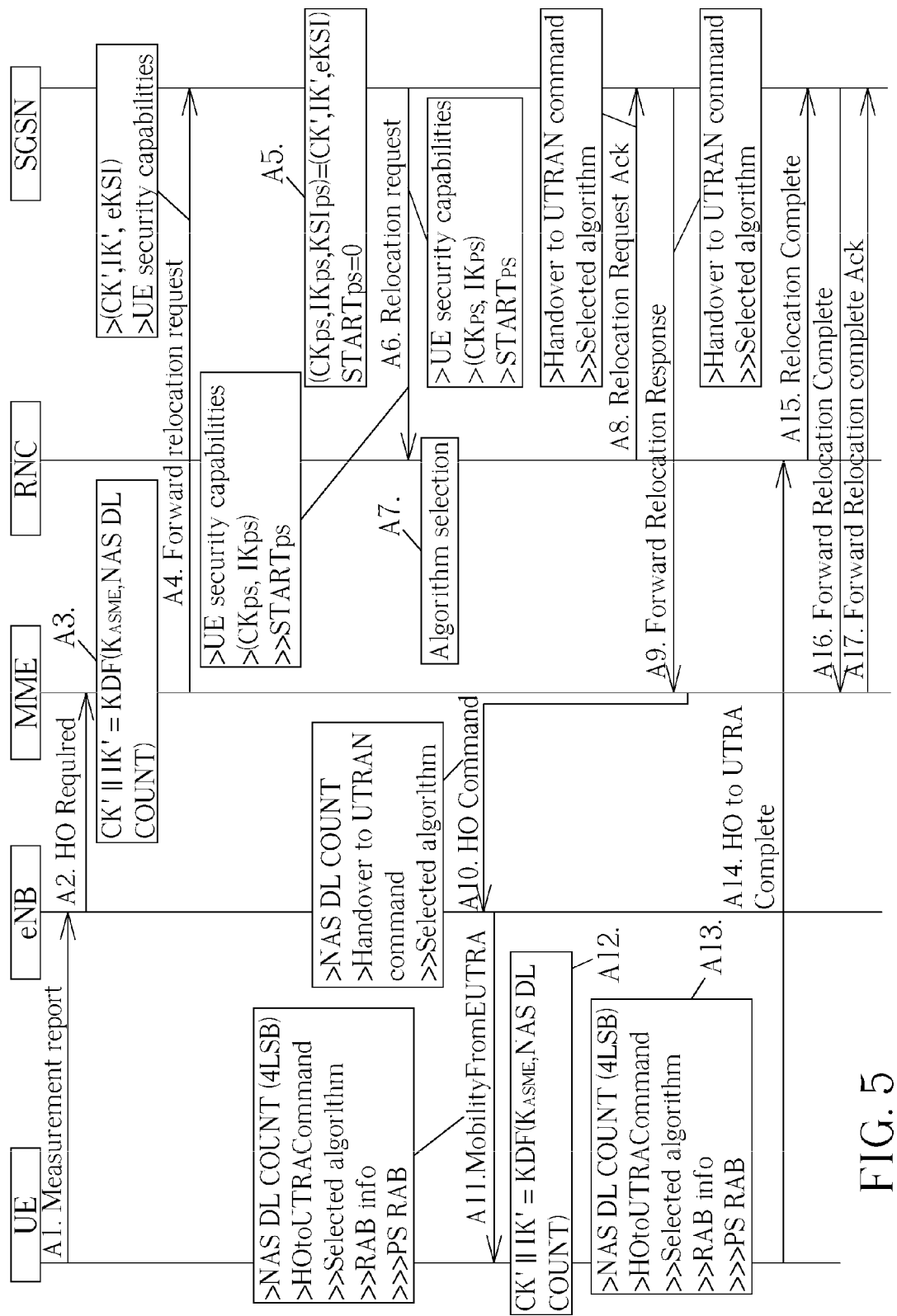
FIG. 5 is a flowchart of a handover according to FIG. 4.

Please refer to FIG. 5, which illustrates a sequence diagram of an inter-RAT handover based on the concept of the process 40. In FIG. 5, a UE is required to perform a handover from an eNB, part of a serving LTE network, to a radio network controller (RNC), part of a target UMTS network, through a forward relocation procedure between a mobile management entity (MME) and a serving GPRS support node (SGSN), where the MME is a source core network node and the SGSN is a target core network node. The inter-RAT handover includes the following steps:

A1: The eNB decides to trigger the inter-RAT handover to UTRAN based on measurement reports of the UE.

A2: The eNB sends a "HO Required" message to the MME.

A3: The MME derives a CK' and an IK' from a $K_{ASME}$ stored in the MME and a NAS DL COUNT with the one-way key derivation function KDF whose output is a 256-bit string. The CK' is the 128 MSBs (Most Significant Bits) of the output, whereas the IK' is the 128 LSBs (Least Significant Bits) of the output.

A4: The MME sends a Forward Relocation Request message to the SGSN. The message includes information for the non-voice component related to PS bearers, e.g. the CK', the IK', an eKSI, and UE security capabilities.

A5: The SGSN sets ($CK_{PS}$, $IK_{PS}$, $KSI_{PS}$) to (CK', IK', eKSI), and a $START_{PS}$ of the SGSN to 0.

A6: The SGSN requests resource allocation for the PS relocation by sending a Relocation Request message to the RNC. The Relocation Request message includes the ($CK_{PS}$, $IK_{PS}$), $START_{PS}$ and the UE security capabilities.

A7: The RNC selects algorithms for ciphering and integrity protection, e.g. UEA1/UEA2 and U1A1/U1A2.

A8: The RNC acknowledges the PS relocation by sending a Relocation Request Acknowledge message including a "Handover to UTRAN command" message to the SGSN. The Handover to UTRAN command message includes the selected algorithms and related security configuration.

A9: The SGSN sends a Forward Relocation Response message including the Handover to UTRAN command message to the MME.

A10: The MME sends a Handover Command (Target to Source Transparent Container) message to the eNB. The Handover Command message includes the NAS DL COUNT and the "Handover to UTRAN command" message.

A11: The eNB sends a MobilityFromEUTRACommand message to the UE. The MobilityFromEUTRACommand message includes the NAS DL COUNT and the "Handover to UTRAN command" message. A "RAB info" IE has PS RABs for the PS relocation and is further included in the "Handover to UTRAN command" message by the eNB.

A12: The UE derives the same CK' and the IK' from a $K_{ASME}$ stored in the UE and the received NAS DL COUNT with the one-way key derivation function KDF.

A13: The UE sets its ($CK_{PS}$, $IK_{PS}$, $KSI_{PS}$) to the derived (CK', IK', eKSI), and its $START_{PS}$ to 0 since the "RAB info" IE includes any PS RAB.

A14: The UE tunes to the UMTS system and sends a "Handover to UTRAN complete" message to the RNC.

A15: The RNC sends a Relocation Complete message to the SGSN.

A16: The SGSN sends a Forward Relocation Complete message to the MME.

A17: The MME acknowledges the information of the Forward Relocation Complete message by sending a Forward Relocation Complete Acknowledge message to the SGSN.

In FIG. 5, the UE and the RNC uses the same ($CK_{PS}$, $IK_{PS}$, $START_{PS}$) for ciphering and integrity protection through A13 to avoid a connection break between the UE and the RNC after the handover.

Furthermore, if the UE receives CS services before the handover, the handover at the core network is performed by the MME and a MSC (Mobile Switching Center) and the RNC uses the ($CK_{CS}$, $IK_{CS}$, $START_{CS}$). In this situation, the "RAB info" IE includes CS RABs, and the UE sets its ($CK_{CS}$, $IK_{CS}$, $KSI_{CS}$) of the UE to the derived (CK', IK', eKSI), and $START_{CS}$ of the UE to 0.

Figure 6A:
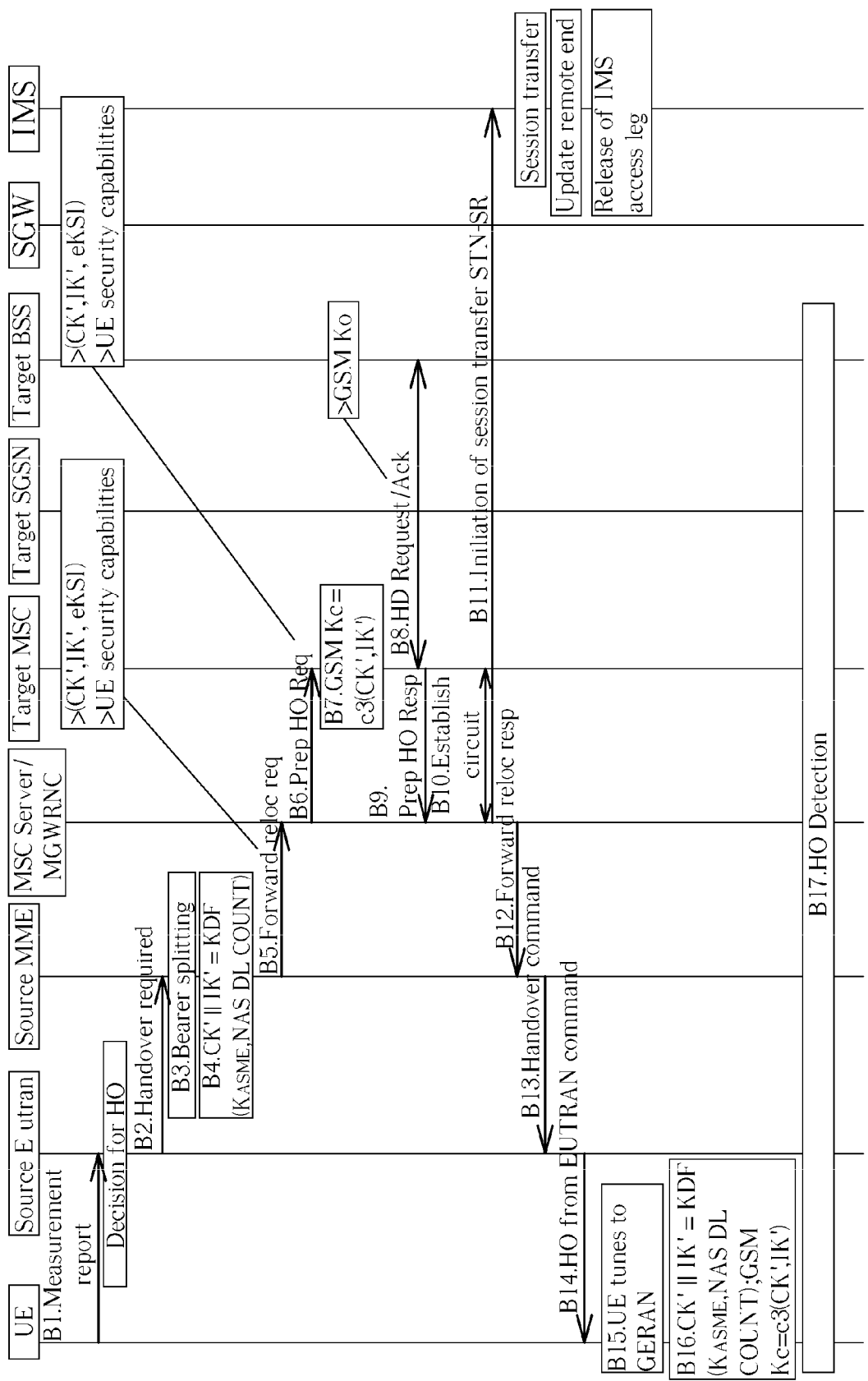
FIGS. 6a-6b illustrate a flowchart of a handover according to FIG. 4.
Figure 6B:
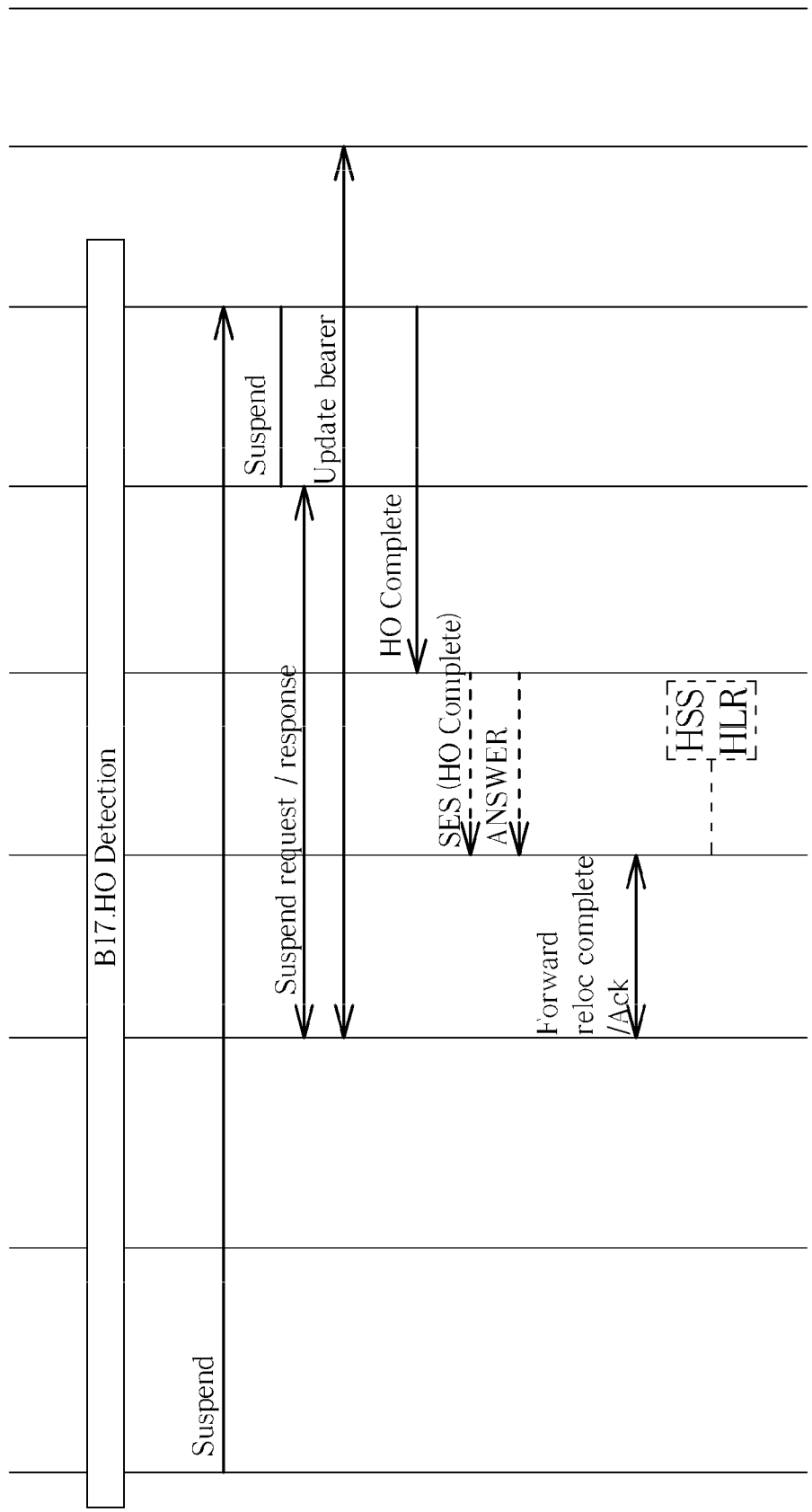

Please refer to FIGS. 6a and 6b, which illustrates a sequence diagram of an inter-RAT handover based on the concept of the process 40. The inter-RAT handover is a SRVCC handover from the LTE system to the GERAN system (non Iu mode) without DTM (Data Transfer Mode)/ PSHO (Packet Switched Handover) support. A source E-UTRAN is a source network, and a target BSS (Base Station Subsystem) is a target network. The source MME is a core network node of the LTE system, and a target MSC and a target SGSN is core network nodes of the GSM system. A MSC server/Media gateway (MGW) is an interfacing core network node between the LTE and GSM systems. The SRVCC handover without DTM/PSHO support includes the following steps:

B1: The source E-UTRAN decides to trigger the SRVCC handover to the GERAN based on UE measurement reports.

B2: The source E-UTRAN sends a "Handover Required" message including a SRVCC handover indication to the source MME.

B3: Based on the QCI (Quality of Service class Indicator) associated with a voice bearer and the SRVCC handover indication, the source MME splits the voice bearer from non-voice bearers and initiates a PS-CS handover procedure for the voice bearer only towards MSC Server.

B4: The source MME derives a CK' and an IK' from a $K_{ASME}$ stored in the MME and a NAS DL COUNT with the one-way key derivation function KDF.

B5: The source MME sends a Forward Relocation Request message including MM context to the MSC Server. The MM Context contains the CK', the IK', an eKSI, and UE security capabilities.

B6: The MSC Server inter-works the PS-CS handover request with a CS inter-MSC handover request by sending a Prepare Handover Request message to the target MSC. The Prepare Handover Request message transfers the security information of the MM Context.

B7: The target MSC derives a GSM ciphering key Kc from the (CK', IK') with a conversion function c3.

B8: The target MSC performs resource allocation with the target BSS by exchanging Handover Request/Acknowledge messages. The target BSS receives the GSM ciphering key Kc from the Handover Request message.

B9: The target MSC sends a Prepare Handover Response message to the MSC Server in response to the Prepare Handover Request message received in B6.

B10: A circuit connection is established between the target MSC and the MGW associated with the MSC Server.

B11: The MSC Server initiates a Session Transfer by sending an STN-SR message towards an IMS (IP Multimedia Subsystem). The downlink flow of Voice packets is switched towards a CS access leg.

B12: The MSC Server sends a Forward Relocation Response message to the source MME.

B13: The source MME sends a Handover Command message to the source E-UTRAN. The Handover Command message includes information about the voice component.

B14: The source E-UTRAN sends a Handover from E-UTRAN Command message including CS connection configuration, e.g. TCH (Traffic Channel) configuration.

B15: The UE tunes to a frequency spectrum of the GERAN system.

B16: According to the CS connection configuration, the UE derives ($CK_{CS}$, $IK_{CS}$) from the $K_{ASME}$ and the NAS DL COUNT with a one-way key derivation function KDF, and then derives a GSM ciphering key Kc, same as the Kc derived in B7, from the derived ($CK_{CS}$, $IK_{CS}$) with the conversion function c3.

B17: The UE performs handover detection at the target BSS.

In addition, since the DTM/PSHO is not supported, the UE needs to perform a suspension procedure through the steps after the B17 to notify the target network that the PS domain service has to be suspended. The messaged used in the steps after the B17 are performed ciphering with the newly-derived GSM ciphering key Kc. Through B16, the UE is able to use the same ciphering key as the target BSS, and use of a wrong key (GPRS ciphering key) is avoided.

Through the process 40, the UE and the target network uses the security configuration of the same service domain for the transmission security during/after the mobility from E-UTRA procedure, thereby preventing a break of the established RRC connection.

Figure 7:
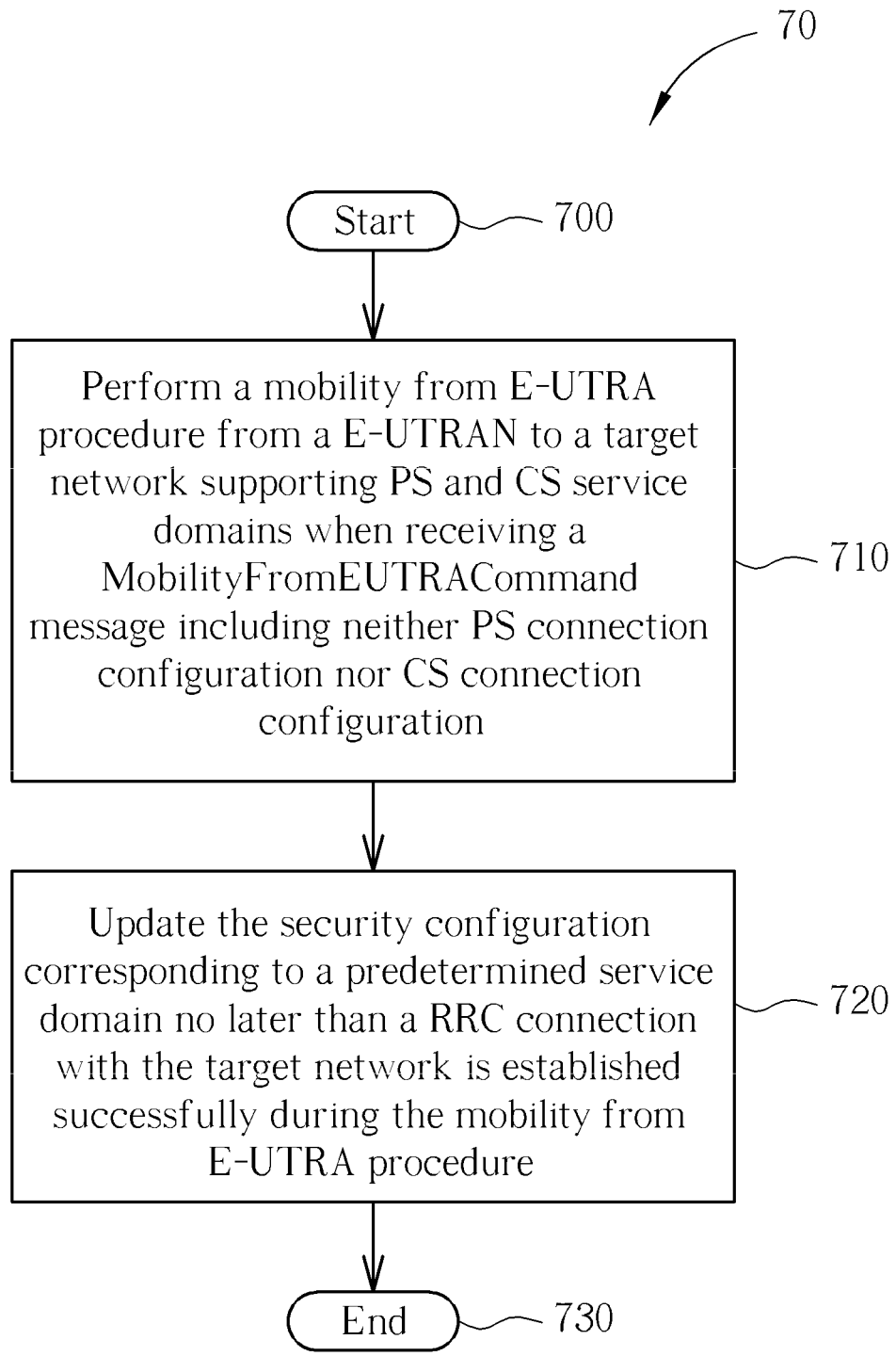
FIG. 7 is a flowchart of a process according to a second embodiment of the present invention.

Please refer to FIG. 7, which illustrates a flowchart of a process 70 according to a second embodiment of the present invention. The process 70 is utilized in a UE of the LTE system for handling handover security configuration. The process 70 can be compiled into the program code 214 and includes the following steps:

Step 700: Start.

Step 710: Perform a mobility from E-UTRA procedure from a E-UTRAN to a target network supporting PS and CS service domains when receiving a MobilityFromEUTRACommand message including neither PS connection configuration nor CS connection configuration.

Step 720: Update the security configuration corresponding to a predetermined service domain no later than a RRC connection with the target network is established successfully during the mobility from E-UTRA procedure.

Step 730: End.

According to the process 70, the UE updates the security configuration corresponding to the predetermined service domain no later than the RRC connection is established successfully when none of connection configuration is included in the MobilityFromEUTRACommand message. Furthermore, the UE can use the updated security configuration for security activation when the RRC connection is successfully established. The security configuration corresponding to the predetermined service domain is also updated and used no later than the time of the successful RRC connection for following transmissions with the mobile device.

Preferably, the MobilityFromEUTRACommand message is used for a CS fallback handover, and also does not include any radio bearer configuration information, e.g. the "RAB info" IE. The predetermined service domain is either the PS or the CS service domain. The way the UE updates the security configuration e.g. ($START_{CS}$, $CK_{CS}$, $IK_{CS}$, $KSI_{CS}$) or ($START_{PS}$, $CK_{PS}$, $IK_{PS}$, $KSI_{PS}$) can be referred to the abovementioned related paragraphs.

Figure 8:
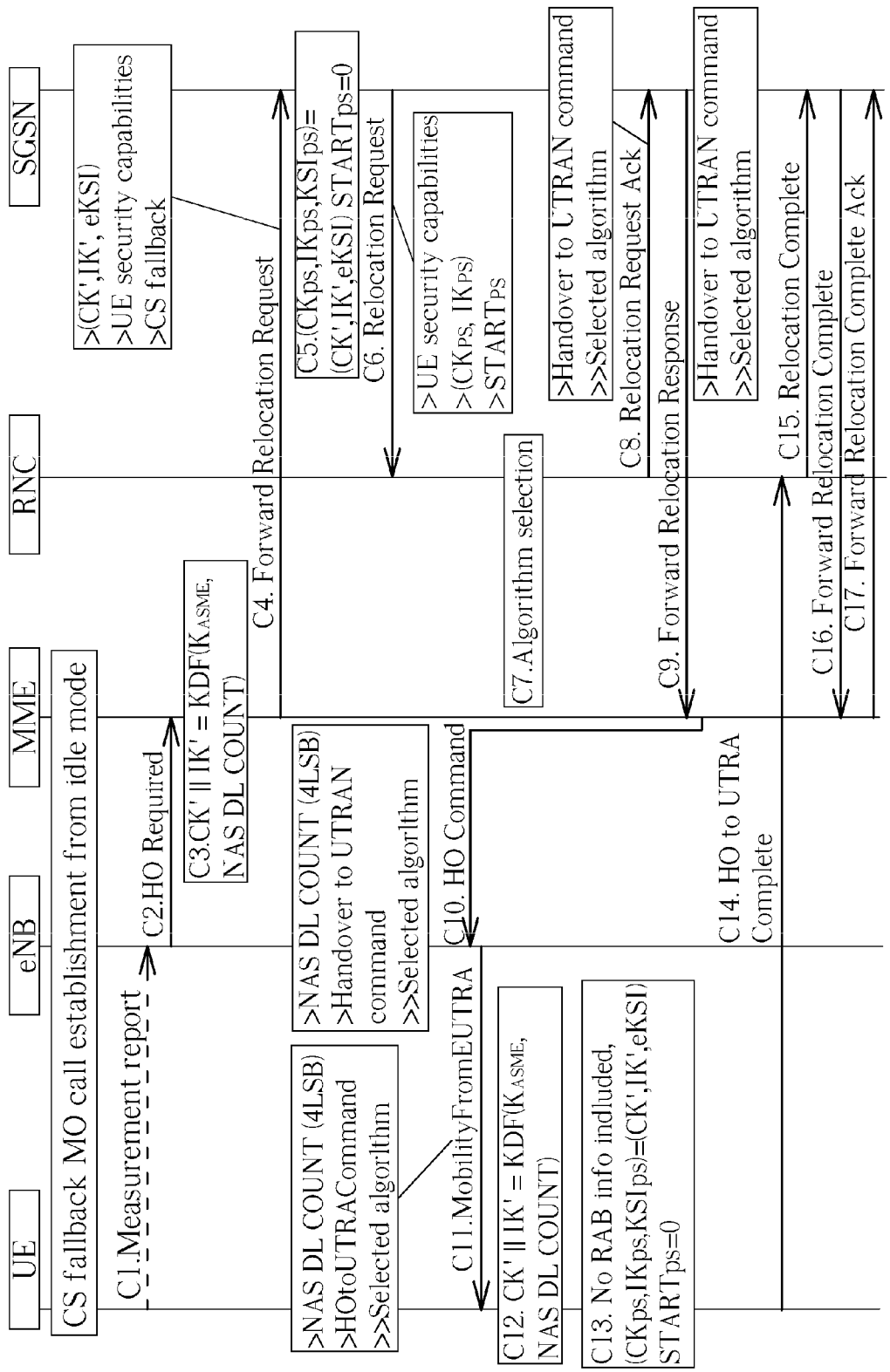
FIG. 8 is a flowchart of a handover according to FIG. 7.

Please refer to FIG. 8, which illustrates a sequence diagram of a handover according to the concept of the process 70. Involved handover nodes in FIG. 8 are the same as those in FIG. 5, and related node positioning is omitted here. Steps C1-C10, C14-C17 are identical with the steps A1-A10, A14-A17 in FIG. 5 and therefore the related detailed description refers to the abovementioned paragraphs for FIG. 5. In FIG. 8, the UE and all the network nodes include a predetermined service domain set to the PS service domain for security configuration. Initially, a CS fallback MO (Mobile Originating) call is established by a UE in idle mode. In C11, the eNB sends a MobilityFromEUTRACommand message to the UE. The MobilityFromEUTRACommand message includes the NAS DL COUNT and the "Handover to UTRAN command" message, and no "RAB info" IE is included. This means that the eNB sends neither PS nor CS connection configuration to the UE. In C12, the UE derives the CK' and the IK' from a $K_{ASME}$ stored in the UE and the received NAS DL COUNT with the one-way key derivation function KDF. In C13, the UE sets its ($CK_{PS}$, $IK_{PS}$, $KSI_{PS}$) to the derived (CK', IK', eKSI), and its $START_{PS}$ to 0 since the MobilityFromEUTRACommand message includes no "RAB info" and the predetermined service domain is the PS domain.

Figure 9:
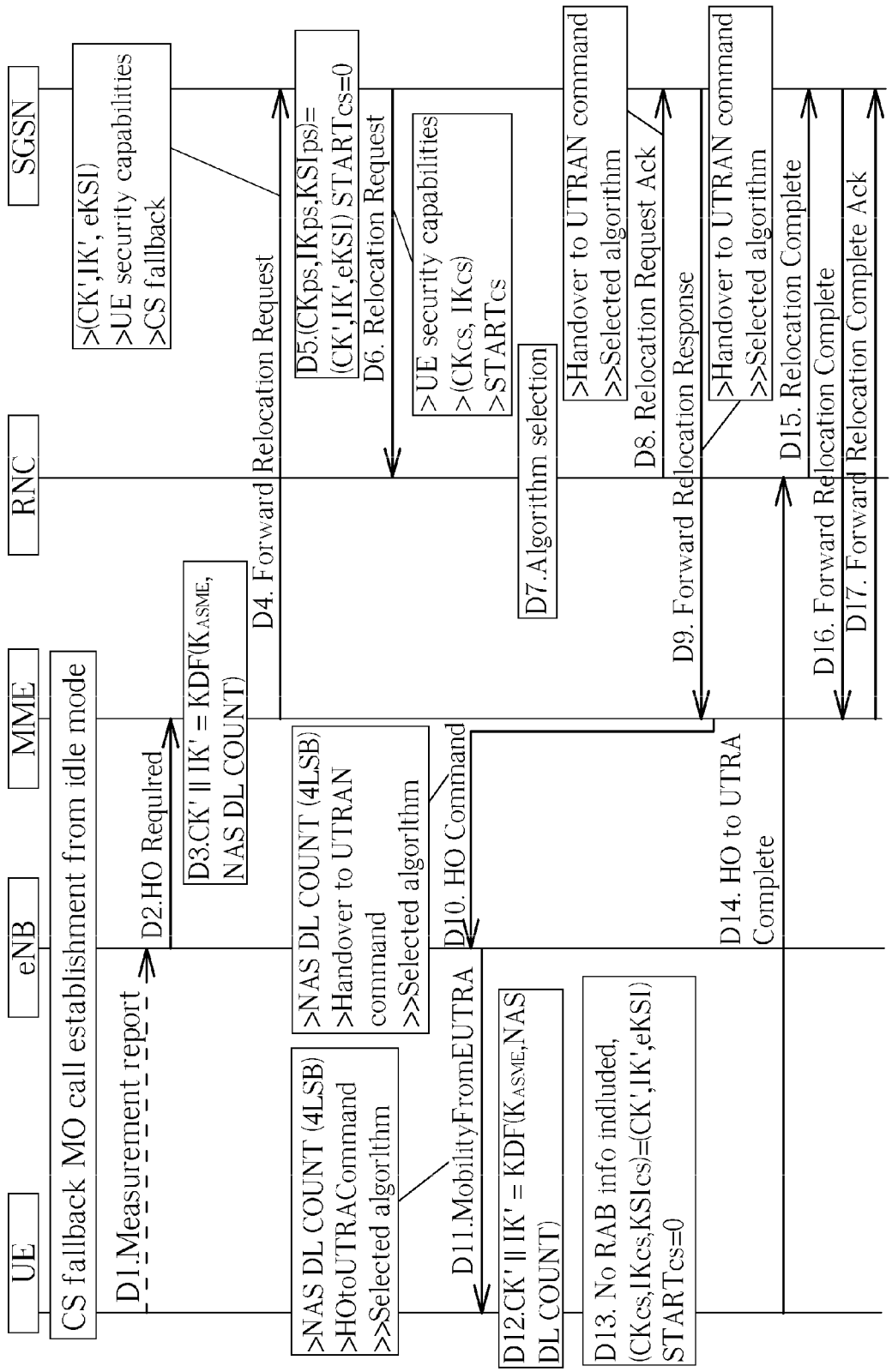
FIG. 9 is a flowchart of a handover according to FIG. 7.

Please refer to FIG. 9, which illustrates a sequence diagram of a handover according to the concept of the process 70. The scenario of FIG. 9 is similar to FIG. 8, and therefore the detailed process can be referred to the above paragraph. FIG. 8 and FIG. 9 have difference in that, in FIG. 9, the UE and all the network nodes include a predetermined service domain set to the CS service domain for security configuration. As a result, the UE and the RNC always use the same security configuration (i.e. CS security configuration) and thereby sets ($CK_{CS}$, $IK_{CS}$, $KSI_{CS}$) to (CK', IK', eKSI) and a $START_{CS}$ set to 0.

In FIGS. 8 and 9, the UE is set to use a predetermined service domain, also used by the target network, for security configuration if the network does not indicate any service domain.

Figure 10:
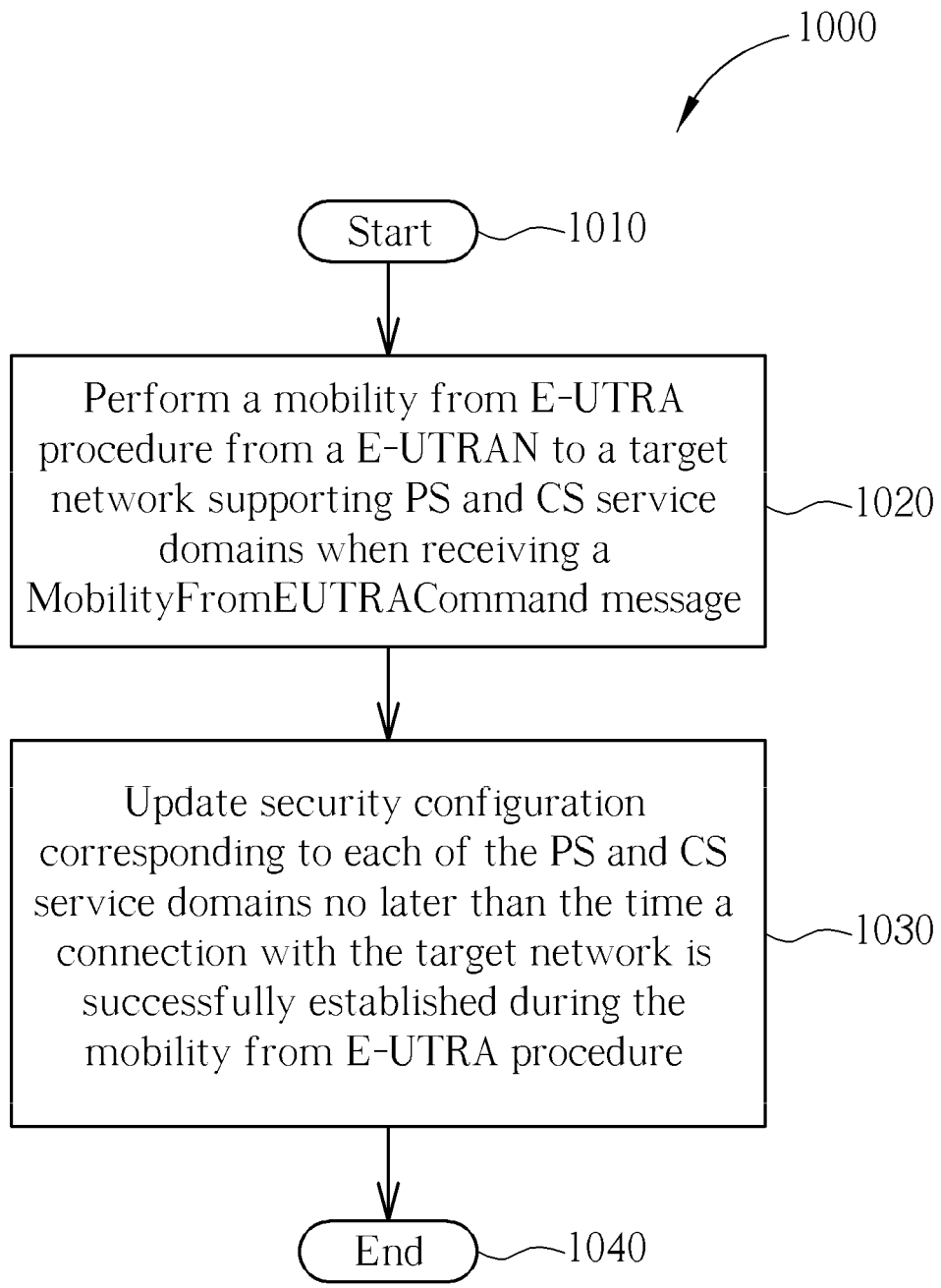
FIG. 10 is a flowchart of a process according to a third embodiment of the present invention.

Please refer to FIG. 10, which illustrates a flowchart of a process 1000 according to a third embodiment of the present invention. The process 1000 is utilized in a UE of the LTE system for handling handover security configuration. The process 1000 can be compiled into the program code 214 and includes the following steps:

Step 1010: Start.

Step 1020: Perform a mobility from E-UTRA procedure from a E-UTRAN to a target network supporting PS and CS service domains when receiving a MobilityFromEUTRACommand message.

Step 1030: Update security configuration corresponding to each of the PS and CS service domains no later than the time a connection with the target network is successfully established during the mobility from E-UTRA procedure.

Step 1040: End.

According to the process 1000, the UE updates security configuration for both the PS and CS service domains before or at the time the connection with the target network is successfully established. Thus, the UE certainly uses the same security configuration content as the target network during/after the handover when new security activation is performed. The update details for a handover to the UMTS, GERAN (non Iu mode) or GERAN (Iu mode) can refer to the abovementioned ways in the first and second embodiments.

Figure 11A:
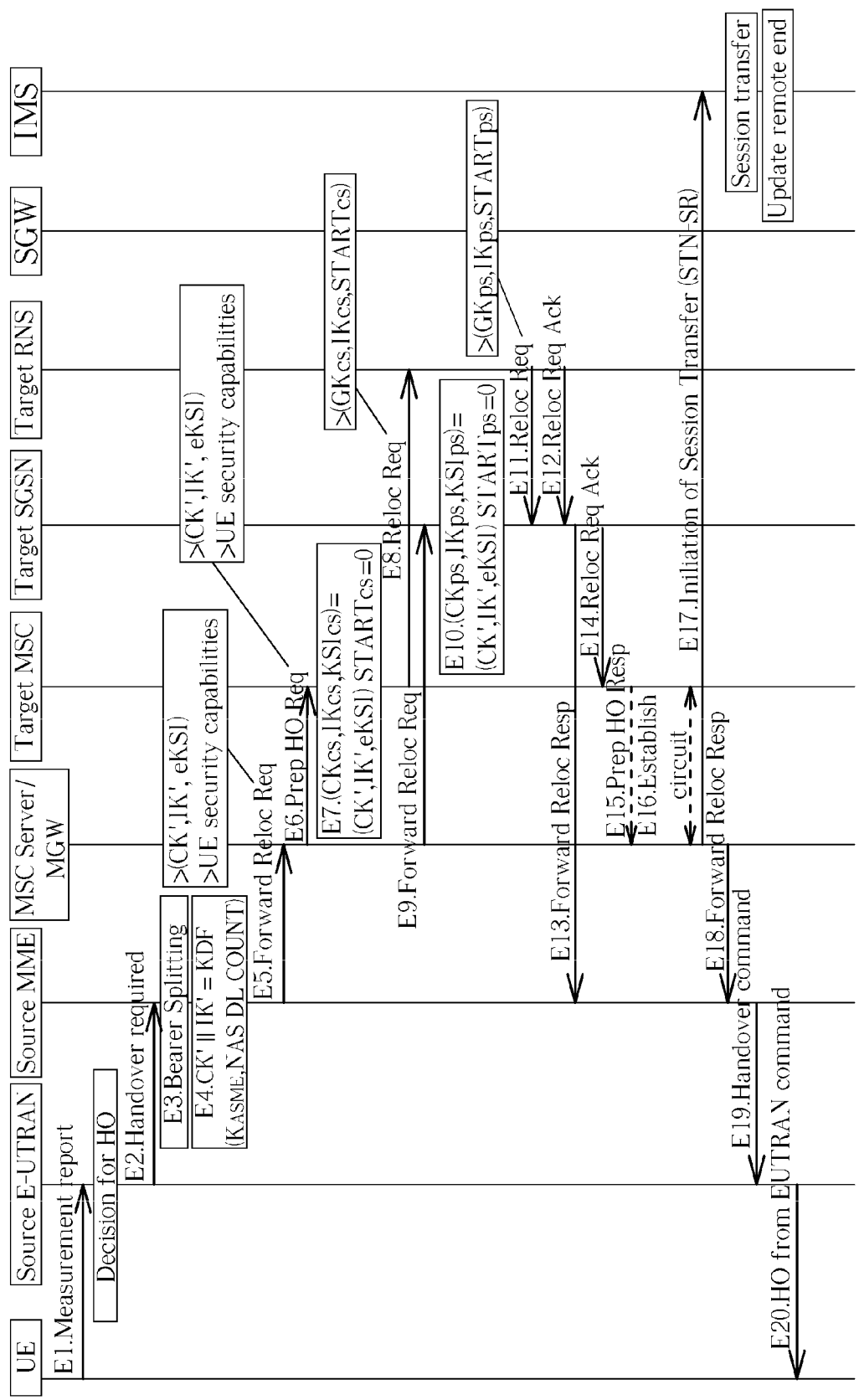
FIGS. 11a-11b illustrate a flowchart of a handover according to FIG. 10.
Figure 11B:
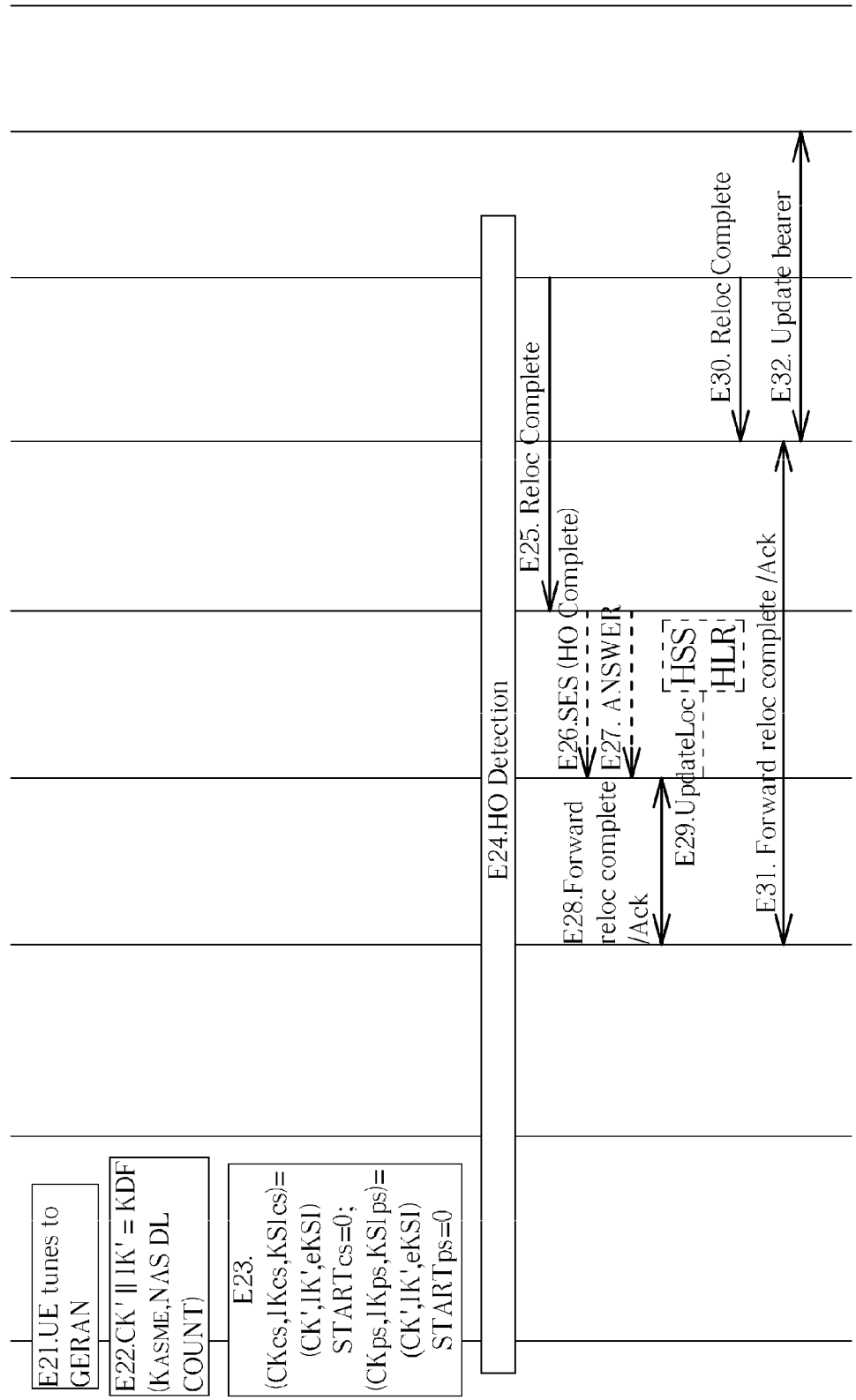

Please refer to FIGS. 11a and 11b, which illustrates a sequence diagram of a SRVCC handover from E-UTRAN to UTRAN with PSHO support according to the concept of the process 1000. A source E-UTRAN is a source network, and a target BSS (Base Station Subsystem) is a target network. The source MME is a core network node of the LTE system, and a target RNS (Radio Network Subsystem) and a target SGSN is core network nodes of the UMTS system. A MSC server/MGW is an interfacing core network node between the LTE and UMTS systems. The SRVCC handover includes the following steps:

E1: The source E-UTRAN decides to trigger the SRVCC handover to the GERAN based on UE measurement reports.

E2: The source E-UTRAN sends a "Handover Required" message including a SRVCC handover indication to the source MME.

E3: Based on the QCI (Quality of Service class Indicator) associated with a voice bearer and the SRVCC handover indication, the source MME splits the voice bearer from non-voice bearers and initiates a PS-CS handover procedure for the voice bearer only towards the MSC Server.

E4: The source MME derives a CK' and an IK' from a $K_{ASME}$ stored in the MME and its NAS DL COUNT with the one-way key derivation function KDF.

E5: The source MME sends a Forward Relocation Request message including MM context to the MSC Server. The MM Context contains the CK', the IK', an eKSI of the MME, and UE security capabilities.

E6: The MSC Server inter-works the PS-CS handover request with a CS inter-MSC handover request by sending a Prepare Handover Request message to the target MSC. The Prepare Handover Request message transfers the security information of the MM Context.

E7: The target MSC sets its ($CK_{CS}$, $IK_{CS}$, $KSI_{CS}$) to (CK', IK', eKSI), and its $START_{CS}$ to 0.

E8: The target MSC requests resource allocation for the CS relocation by sending a Relocation Request message including ($CK_{CS}$, $IK_{CS}$, $START_{CS}$) to the target RNS.

E9: The source MME sends a Forward Relocation Request message including the MM Context to the target SGSN. The Forward Relocation Request message includes information for the non-voice component only.

E10: The target SGSN sets its ($CK_{PS}$, $IK_{PS}$, $KSI_{PS}$) to the received (CK', IK', eKSI), and its $START_{PS}$ to 0.

E11: The target SGSN requests resource allocation for the PS relocation by sending a Relocation Request message including ($CK_{PS}$, $IK_{PS}$, $START_{PS}$) to the target RNS.

E12: The target RNS acknowledges the prepared PS relocation by sending a Relocation Request Acknowledge message to the target SGSN.

E13: The target SGSN sends a Forward Relocation Response message to the source MME.

E14: The target RNS acknowledges the prepared CS relocation by sending a Relocation Request Acknowledge message to the target MSC.

E15: The target MSC sends a Prepare Handover Response message to the MSC Server.

E16: A circuit connection is established between the target MSC and the MGW associated with the MSC Server.

E17: The MSC Server initiates a Session Transfer by sending an STN-SR message towards the IMS. The downlink flow of voice packets is switched towards a CS access leg.

E18: The MSC Server sends a Forward Relocation Response message to the source MME.

E19: The source MME synchronizes the PS and CS prepared relocations and sends a Handover Command message including a NAS DL COUNT to the source E-UTRAN.

E20: The source E-UTRAN sends a Handover from E-UTRAN Command message to the UE.

E21: The UE tunes to a frequency spectrum of the UTRAN system.

E22: The UE derives a CK' and an IK' from its $K_{ASME}$ and the received NAS DL COUNT with the one-way key derivation function KDF.

E23: The UE sets both its ($CK_{PS}$, $IK_{PS}$, $KSI_{PS}$) and ($CK_{CS}$, $IK_{CS}$, $KSI_{CS}$) to the (CK', IK', eKSI), and sets both its $START_{PS}$ and $START_{CS}$ to 0.

B24: The UE performs handover detection at the target RNS.

E25-E29 are used for completing the CS relocation, and E30-E32 are used for completing the PS relocation. Through, E9-E11, the source MME initiates relocation of the remaining non-voice PS bearers. Through E12-E13, the target RNS coordinates the CS relocation request with the PS relocation request and assigns resources. In FIG. 11, the UE always updates both PS/CS security configurations, irrespective of content of the Handover from E-UTRAN Command message. Therefore, the UE and the target network can use the same security content for ciphering and integrity protection.

Figure 12A:
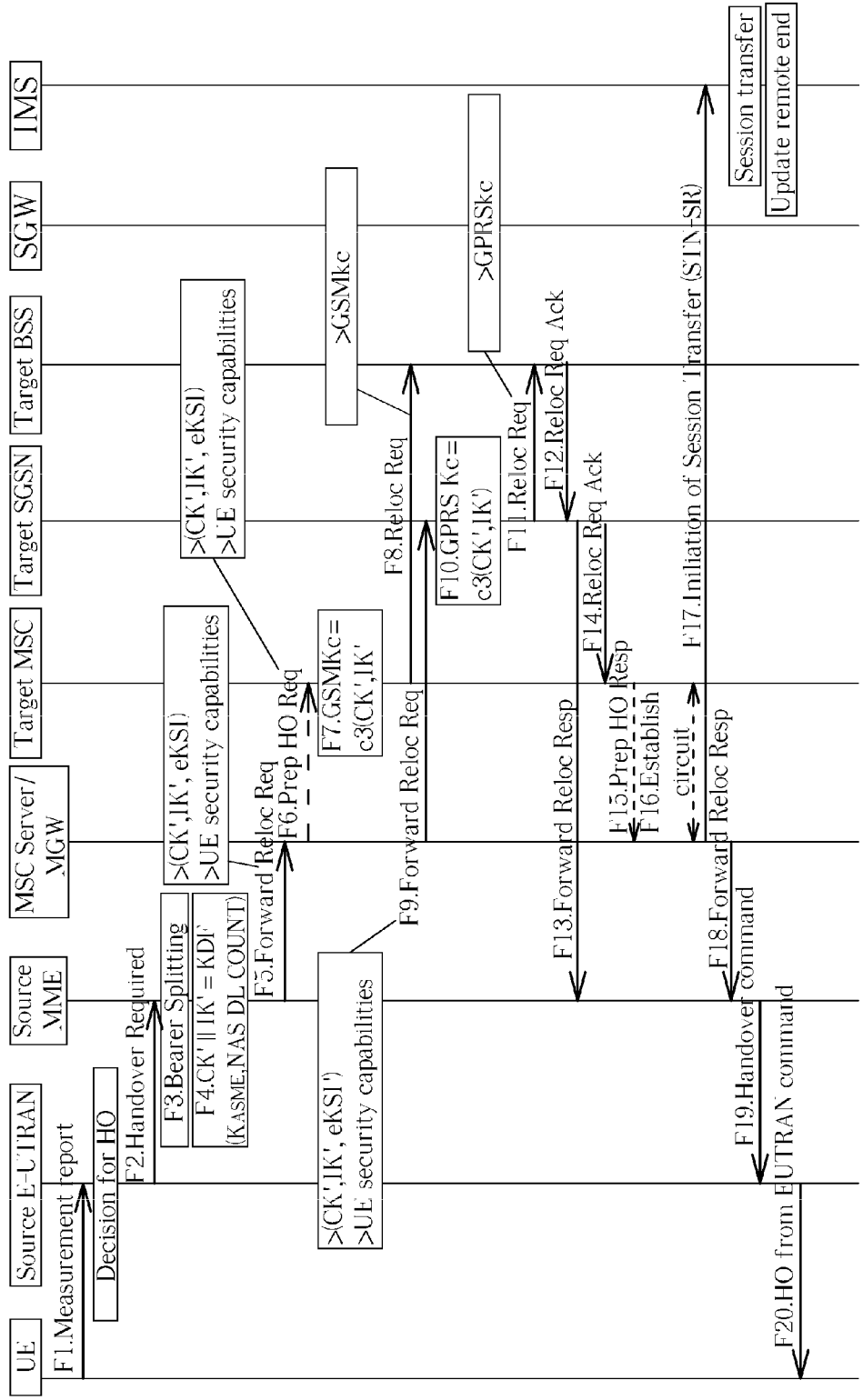
FIGS. 12a-12b illustrate a flowchart of a handover according to FIG. 10.
Figure 12B:
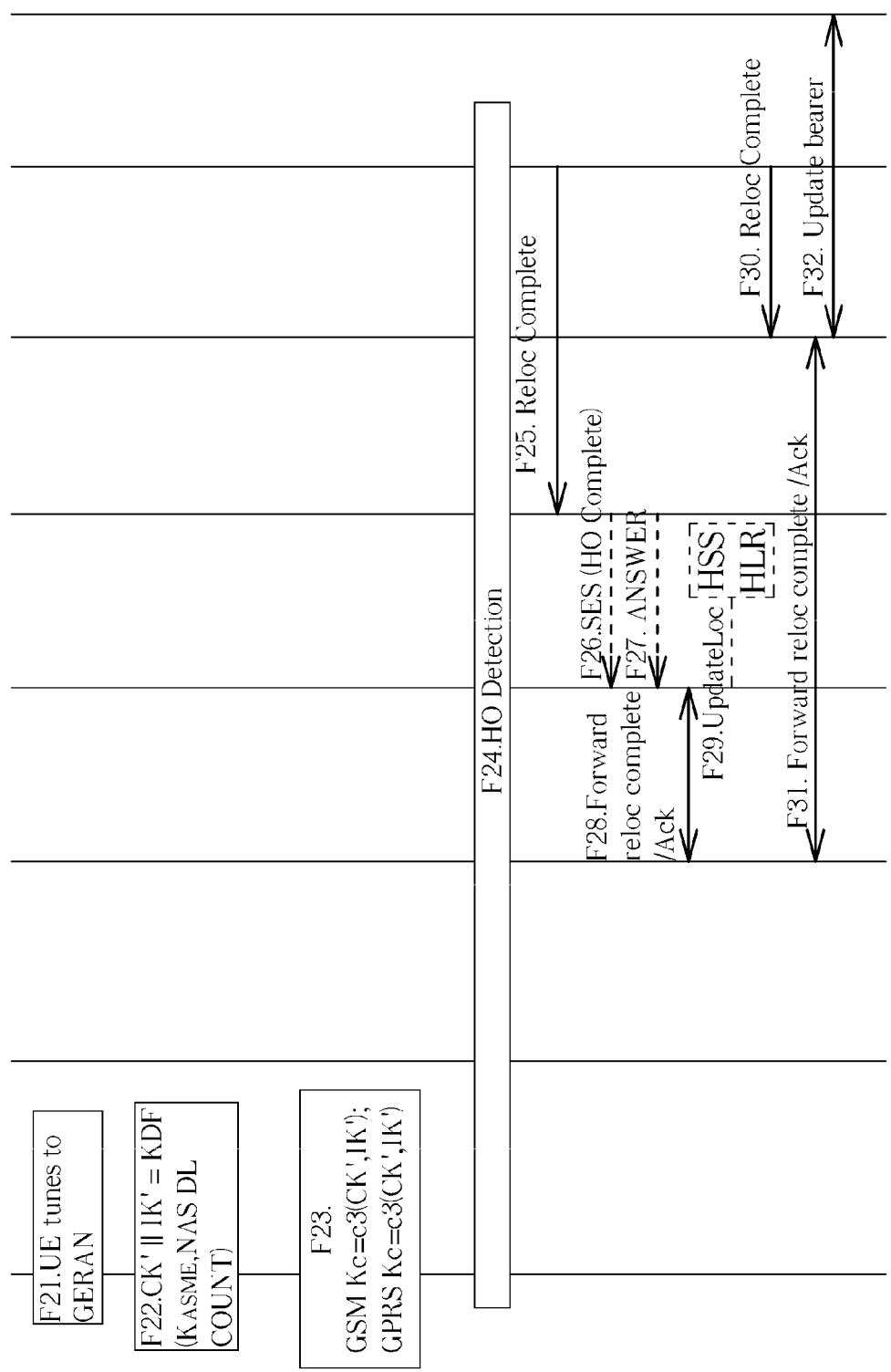

Please refer to FIGS. 12a and 12b, which illustrates a sequence diagram of a SRVCC handover from E-UTRAN to GERAN with DTM support according to the concept of the process 1000. Steps associated with the SRVCC handover from E-UTRAN to GERAN are almost the same as the steps of the SRVCC handover from E-UTRAN to UTRAN in FIG. 11. Only the security content is different. For example, the target MSC derives a GSM ciphering key Kc from the (CK', IK') with a conversion function c3 in F7 compared with E7. The target MSC requests resource allocation for the CS relocation by sending a Relocation Request message including the GSM ciphering key Kc to the target BSS in F8. The target SGSN derives a GPRS ciphering key Kc from the (CK', IK') with the conversion function c3 in F10 compared with E10. The UE tunes to a frequency spectrum of the GERAN system in F21. The UE derives its own GPRS/GSM ciphering keys Kc from the (CK', IK') with the conversion function c3 in F23 compared with E23.

In the foregoing embodiments, the security configuration of each system can be stored in the USIM or the ME (Mobile Entity) of the UE; the UE can transmit a handover complete message to activate ciphering/integrity protection with the updated security configuration after the handover command (e.g. the MobilityFromEUTRACommand message) is received. Please note that the embodiments do not aim to limit the number of the service domains of the target network, and wireless communication systems supporting three or more than three service domains are considered within the scope of the present invention.

In conclusion, the embodiments of the present invention provide the security configuring mechanisms for the UE, so as to avoid a connection break resulting from incompliance of security configuration between the UE and the target network.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling handover security configuration for a mobile device of a wireless communication system, the method comprising:

performing an inter-radio access technology, hereinafter called RAT, handover procedure from a long-term evolution (LTE) network including only packet-switched (PS) domain to a universal terrestrial radio access network (UTRAN) including both circuit-switched (CS) and PS domains when receiving a handover command, wherein the mobile device includes security configuration including a mobility-management-level key and an evolved key set identifier corresponding to the PS domain of the LTE network, security configuration including a cipher key and an integrity key corresponding to the CS domain of the UTRAN and security configuration including a cipher key and an integrity key corresponding to the PS domain of the UTRAN;

when the handover command includes a radio access bearer (RAB) info information element (IE) including CS RAB of the UTRAN, updating the security configuration corresponding to the CS domain of the UTRAN with the security configuration corresponding to the PS domain of the LTE network, no later than the time a connection with the UTRAN is successfully established during the inter-RAT handover procedure, wherein the inter-RAT handover procedure is used for a Single Radio Voice Call Continuity handover; and when the handover command includes a RAB info IE including PS RAB of the UTRAN, updating the security configuration corresponding to the PS domain of the UTRAN with the security configuration corresponding to the PS domain of the LTE network, no later than the time a connection with the UTRAN is successfully established during the inter-RAT handover procedure;

wherein updating the security configuration corresponding to the CS domain of the UTRAN with the security configuration including the mobility-management-level key and the evolved key set identifier corresponding to the PS domain of the LTE network no later than the time the connection with the UTRAN is established successfully during the inter-RAT handover procedure comprises:

setting a key set identifier corresponding to the CS domain of the UTRAN to a value of the evolved key set identifier corresponding to the LTE network;

deriving a cipher key of the CS domain of the UTRAN and an integrity key of the CS domain of the UTRAN from the mobility-management-level key and a non-access stratum downlink COUNT with a one-way key derivation function; and setting the cipher key and the integrity key corresponding to the CS domain of the UTRAN to the cipher key of the CS domain of the UTRAN and the integrity key of the CS domain of the UTRAN respectively; and wherein updating the security configuration corresponding to the PS domain of the UTRAN with the security configuration including the mobility-management-level key and the evolved key set identifier corresponding to the PS domain of the LTE network no later than the time the connection with the UTRAN is established successfully during the inter-RAT handover procedure comprises:

setting a key set identifier corresponding to the PS domain of the UTRAN to the value of the evolved key set identifier corresponding to the LTE network;

deriving a cipher key of the PS domain of the UTRAN and an integrity key of the PS domain of the UTRAN from the mobility-management-level key and a non-access stratum downlink COUNT with a one-way key derivation function; and setting the cipher key and the integrity key corresponding to the PS domain of the UTRAN to the cipher key of the PS domain of the UTRAN and the integrity key of the PS domain of the UTRAN respectively.

2. The method of claim 1, wherein the security configuration of the UTRAN corresponding to the CS domain of the UTRAN is updated and used no later than the time the connection is established successfully during the inter-RAT handover procedure.

3. The method of claim 2, wherein the security configuration corresponding to the CS domain of the UTRAN includes a START parameter updated to zero.

4. The method of claim 1 further comprising:
when the handover command does not include any connection configuration corresponding to the PS domain of the UTRAN, retaining the security configuration corresponding to the PS domain of the UTRAN.

5. The method of claim 1, wherein updating the security configuration corresponding to the CS domain of the UTRAN with the security configuration corresponding to the PS domain of the LTE network no later than the time the connection with the UTRAN is established successfully during the inter-RAT handover procedure comprises:
setting a START parameter corresponding to the CS domain of the UTRAN to zero no later than the time the connection with the UTRAN is established successfully during the inter-RAT handover procedure.

6. The method of claim 1, wherein updating the security configuration corresponding to the CS domain of the UTRAN with the security configuration corresponding to the PS domain of the LTE network no later than the time the connection with the UTRAN is established successfully during the inter-RAT handover procedure comprises:
deriving a ciphering key from the cipher key of the CS domain of the UTRAN and the integrity key of the CS domain of the UTRAN.

7. The method of claim 1 further comprising:
when the handover command does not include any connection configuration corresponding to one of the CS domain and the PS domain of the UTRAN, updating the security configuration corresponding to a predetermined service domain of the UTRAN with the security configuration corresponding to the PS domain of the LTE network no later than the time the connection with the UTRAN is successfully established during the inter-RAT handover procedure.

8. The method of claim 7, wherein the security configuration of the UTRAN corresponding to the predetermined service domain is updated and used no later than the time the connection is established successfully during the inter-RAT handover procedure.

9. The method of claim 8, wherein the security configuration corresponding to the CS domain of the UTRAN includes a START parameter updated to zero.

10. The method of claim 7, wherein when the handover command does not include any connection configuration corresponding to one of the CS domain and PS domain of the UTRAN, updating the security configuration corresponding to the predetermined service domain of the UTRAN with the security configuration corresponding to the PS domain of the LTE network no later than the time the connection with the UTRAN is successfully established during the inter-RAT handover procedure comprises:
when the handover command does not include any radio bearer configuration information corresponding to one of the CS domain and PS domain of the UTRAN, updating the security configuration corresponding to the predetermined service domain of the UTRAN with the security configuration corresponding to the PS domain of the LTE network no later than the time the connection with the UTRAN is successfully established during the inter-RAT handover procedure.

11. The method of claim 7, wherein updating the security configuration corresponding to the predetermined service domain of the UTRAN with the security configuration corresponding to the PS domain of the LTE network no later than the time the connection with the UTRAN is successfully established during the inter-RAT handover procedure comprises:
  setting a START parameter corresponding to the predetermined service domain of the UTRAN to zero no later than the time the connection with the UTRAN is successfully established during the inter-RAT handover procedure.

12. The method of claim 11, wherein updating the security configuration corresponding to the predetermined service domain of the UTRAN with the security configuration corresponding to the PS domain of the LTE network no later than the time the connection with the UTRAN is successfully established during the inter-RAT handover procedure further comprises:
  setting a key set identifier corresponding to the predetermined service domain of the UTRAN to a value of the evolved key set identifier; and
  deriving a cipher key of the predetermined service domain of the UTRAN and an integrity key of the predetermined service domain of the UTRAN from the mobility-management-level key and a non-access stratum downlink COUNT.

13. The method of claim 7, wherein updating the security configuration corresponding to the predetermined service domain of the UTRAN with the security configuration corresponding to the PS domain of the LTE network no later than the time the connection with the UTRAN is successfully established during the inter-RAT handover procedure comprises:
  deriving a cipher key of the predetermined service domain of the UTRAN and an integrity key of the predetermined service domain of the UTRAN from the mobility-management-level key and a non-access stratum downlink COUNT with a one-way key derivation function; and
  deriving a ciphering key from the cipher key of the predetermined service domain of the UTRAN and the integrity key of the predetermined service domain of the UTRAN.

14. The method of claim 7, wherein the inter-RAT handover procedure is used for a CS fallback handover.

15. A method of handling handover security configuration for a mobile device of a wireless communication system, the method comprising:
  performing an inter-radio access technology, hereinafter called RAT, handover procedure from a long-term evolution (LTE) network including only packet-switched (PS) domain to a universal terrestrial radio access network (UTRAN) including both circuit-switched (CS) and PS service domains, wherein the mobile device includes security configuration including a mobility-management-level key and an evolved key set identifier corresponding to the PS domain of the LTE network, security configuration including a cipher key and an integrity key corresponding to the CS domain of the UTRAN and security configuration including a cipher key and an integrity key corresponding to the PS domain of the UTRAN, wherein the inter-RAT handover procedure is used for a Single Radio Voice Call Continuity handover; and
  updating the security configuration corresponding to each of the CS and PS domains of the UTRAN with the security configuration corresponding to the PS domain of the LTE network no later than the time a connection with the UTRAN is successfully established during the inter-RAT handover procedure;
  wherein updating the security configuration corresponding to the CS domain of the UTRAN with the security configuration including the mobility-management-level key and the evolved key set identifier corresponding to the PS domain of the LTE network no later than the time the connection with the UTRAN is established successfully during the inter-RAT handover procedure comprises:
    setting a key set identifier corresponding to the CS domain of the UTRAN to a value of the evolved key set identifier corresponding to the LTE network;
    deriving a cipher key of the CS domain of the UTRAN and an integrity key of the CS domain of the UTRAN from the mobility-management-level key and a non-access stratum downlink COUNT with a one-way key derivation function; and
    setting the cipher key and the integrity key corresponding to the CS domain of the UTRAN to the cipher key of the CS domain of the UTRAN and the integrity key of the CS domain of the UTRAN respectively; and
  wherein updating the security configuration corresponding to the PS domain of the UTRAN with the security configuration including the mobility-management-level key and the evolved key set identifier corresponding to the PS domain of the LTE network no later than the time the connection with the UTRAN is established successfully during the inter-RAT handover procedure comprises:
    setting a key set identifier corresponding to the PS domain of the UTRAN to the value of the evolved key set identifier corresponding to the LTE network;
    deriving a cipher key of the PS domain of the UTRAN and an integrity key of the PS domain of the UTRAN from the mobility-management-level key and a non-access stratum downlink COUNT with a one-way key derivation function; and
    setting the cipher key and the integrity key corresponding to the PS domain of the UTRAN to the cipher key of the PS domain of the UTRAN and the integrity key of the PS domain of the UTRAN respectively.

16. The method of claim 15, wherein performing the inter-RAT handover procedure from the LTE network to the UTRAN comprises performing the inter-RAT handover procedure from the LTE network to the UTRAN when receiving a handover command including connection configuration corresponding to at least one of the CS and PS domains of the UTRAN.

17. The method of claim 16, wherein performing the inter-RAT handover procedure from the LTE network to the UTRAN comprises performing the inter-RAT handover procedure from the LTE network to the UTRAN when receiving a handover command including connection configuration corresponding to the PS domain of the LTE network.

18. The method of claim 15, wherein updating the security configuration corresponding to each of the CS and PS domains of the UTRAN with the security configuration corresponding to the PS domain of the LTE network no later than the time the connection with the UTRAN is successfully established during the inter-RAT handover procedure comprises:
  setting a START parameter corresponding to each of the CS and PS domains of the UTRAN to zero no later than the time the connection with the UTRAN is successfully established during the inter-RAT handover procedure.

19. The method of claim 15, wherein updating the security configuration corresponding to each of the CS and PS domains of the UTRAN with the security configuration corresponding to the PS domain of the LTE network no later than the time the connection with the UTRAN is successfully established during the inter-RAT handover procedure comprises: deriving a ciphering key from the cipher key of the CS domain of the network UTRAN and the integrity key of the CS domain of the UTRAN.

20. A communication device of a wireless communication system for handling handover security configuration, the communication device comprising:
- a computer readable recording medium for storing program code corresponding to a process;
- a processor coupled to the computer readable recording medium, for processing the program code to execute the process;
- security configuration including a mobility-management-level key and an evolved key set identifier corresponding to a packet-switched (PS) domain of a long-term evolution (LTE);
- security configuration including a cipher key and an integrity key corresponding to circuit-switched (CS) domain of a universal terrestrial radio access network (UTRAN); and
- security configuration including a cipher key and an integrity key corresponding to the PS domain of the UTRAN;
- wherein the process comprises:
  - performing an inter-radio access technology, hereinafter called RAT, handover procedure from the LTE network including only PS domain to a target network including both CS and PS domains of the UTRAN when receiving a handover command, wherein the mobile device includes the security configuration corresponding to the PS domain of the LTE network, and the security configuration corresponding to the CS domain of the UTRAN and the security configuration corresponding to the PS domain of the UTRAN;
  - when the handover command includes a radio access bearer (RAB) info information element (IE) including CS RAB of the UTRAN, updating the security configuration corresponding to the CS domain of the UTRAN with the security configuration corresponding to the PS domain of the LTE network, no later than the time a connection with the UTRAN is successfully established during the inter-RAT handover procedure, wherein the inter-RAT handover procedure is used for a Single Radio Voice Call Continuity handover; and
  - when the handover command includes a RAB info IE including PS RAB of the UTRAN, updating the security configuration corresponding to the PS domain of the UTRAN with the security configuration corresponding to the PS domain of the LTE network, no later than the time a connection with the UTRAN is successfully established during the inter-RAT handover procedure;
  - wherein updating the security configuration corresponding to the CS domain of the UTRAN with the security configuration including the mobility-management-level key and the evolved key set identifier corresponding to the PS domain of the LTE network no later than the time the connection with the UTRAN is established successfully during the inter-RAT handover procedure comprises:
    - setting a key set identifier corresponding to the CS domain of the UTRAN to a value of the evolved key set identifier corresponding to the LTE network,
    - deriving a cipher key of the CS domain of the UTRAN and an integrity key of the CS domain of the UTRAN from the mobility-management-level key and a non-access stratum downlink COUNT with a one-way key derivation function, and
    - setting the cipher key and the integrity key corresponding to the CS domain of the UTRAN to the cipher key of the CS domain of the UTRAN and the integrity key of the CS domain of the UTRAN respectively; and
  - wherein updating the security configuration corresponding to the PS domain of the UTRAN with the security configuration including the mobility-management-level key and the evolved key set identifier corresponding to the PS domain of the LTE network no later than the time the connection with the UTRAN is established successfully during the inter-RAT handover procedure comprises:
    - setting a key set identifier corresponding to the PS domain of the UTRAN to the value of the evolved key set identifier corresponding to the LTE network,
    - deriving a cipher key of the PS domain of the UTRAN and an integrity key of the PS domain of the UTRAN from the mobility-management-level key and a non-access stratum downlink COUNT with a one-way key derivation function, and
    - setting the cipher key and the integrity key corresponding to the PS domain of the UTRAN to the cipher key of the PS domain of the UTRAN and the integrity key of the PS domain of the UTRAN respectively.

21. The communication device of claim 20, wherein the process further comprises:
when the handover command does not include any connection configuration corresponding to a PS domain of the CS and PS domains of the UTRAN, retaining the security configuration corresponding to the PS domain of the UTRAN.

22. The communication device of claim 20, the process further comprises:
when the handover command does not include any connection configuration corresponding to the CS and PS domains of the UTRAN, updating the security configuration corresponding to a predetermined service domain of the CS and PS service domains of the UTRAN with the security configuration corresponding to the PS domain of the LTE network no later than the time the connection with the UTRAN is successfully established during the inter-RAT handover procedure.

23. A communication device of a wireless communication system for handling handover security configuration, the communication device comprising:
- a computer readable recording medium for storing program code corresponding to a process;
- a processor coupled to the computer readable recording medium, for processing the program code to execute the process;
- security configuration including a mobility-management-level key and an evolved key set identifier corresponding to a packet-switched (PS) domain of a long-term evolution (LTE) network;
- security configuration corresponding to circuit-switched (CS) domain of a universal terrestrial radio access network (UTRAN); and
- security configuration including a cipher key and an integrity key corresponding to the PS domain of the UTRAN;
- wherein the process comprises:

performing an inter-radio access technology, hereinafter called RAT, handover procedure from the LTE network including only the PS domain to the UTRAN including both the CS and PS domains wherein the mobile device includes security configuration corresponding to the PS domain of the LTE network, the security configuration corresponding to the CS domain of the UTRAN and the security configurations corresponding to the CS and PS domains of the UTRAN, wherein the inter-RAT handover procedure is used for a Single Radio Voice Call Continuity handover; and updating the security configuration corresponding to each of the CS and PS domains of the UTRAN with the security configuration including the mobility-management-level key and the evolved key set identifier corresponding to the PS domain of the LTE network no later than the time a connection with the UTRAN is successfully established during the inter-RAT handover procedure;

wherein updating the security configuration corresponding to the CS domain of the UTRAN with the security configuration including the mobility-management-level key and the evolved key set identifier corresponding to the PS domain of the LTE network no later than the time the connection with the UTRAN is established successfully during the inter-RAT handover procedure comprises:

setting a key set identifier corresponding to the CS domain of the UTRAN to a value of the evolved key set identifier corresponding to the LTE network;

deriving a cipher key of the CS domain of the UTRAN and an integrity key of the CS domain of the UTRAN from the mobility-management-level key and a non-access stratum downlink COUNT with a one-way key derivation function; and setting the cipher key and the integrity key corresponding to the CS domain of the UTRAN to the cipher key of the CS domain of the UTRAN and the integrity key of the CS domain of the UTRAN respectively; and wherein updating the security configuration corresponding to the PS domain of the UTRAN with the security configuration including the mobility-management-level key and the evolved key set identifier corresponding to the PS domain of the LTE network no later than the time the connection with the UTRAN is established successfully during the inter-RAT handover procedure comprises:

setting a key set identifier corresponding to the PS domain of the UTRAN to the value of the evolved key set identifier corresponding to the LTE network;

deriving a cipher key of the PS domain of the UTRAN and an integrity key of the PS domain of the UTRAN from the mobility-management-level key and a non-access stratum downlink COUNT with a one-way key derivation function; and setting the cipher key and the integrity key corresponding to the PS domain of the UTRAN to the cipher key of the PS domain of the UTRAN and the integrity key of the PS domain of the UTRAN respectively.

24. The communication device of claim 23, wherein performing the inter-RAT handover procedure from the LTE network to the UTRAN comprises performing the inter-RAT handover procedure from the LTE network to the UTRAN when receiving a handover command including connection configuration corresponding to at least one of the CS and PS domains of the UTRAN.

25. The communication device of claim 24, wherein performing the inter-RAT handover procedure from the LTE network to the UTRAN comprises performing the inter-RAT handover procedure from the LTE network to the UTRAN when receiving a handover command including connection configuration corresponding to the PS domain of the UTRAN.

* * * * *